(12) United States Patent
Suzuki et al.

(10) Patent No.: US 7,851,049 B2
(45) Date of Patent: Dec. 14, 2010

(54) HEAT-SHRINKABLE CYLINDRICAL LABEL

(75) Inventors: Masahito Suzuki, Osaka (JP); Tooru Sakamoto, Yuki (JP); Takehisa Hashimoto, Osaka (JP); Yasuo Ose, Osaka (JP); Masahiro Kaminaga, Osaka (JP); Naomi Hozumi, Osaka (JP)

(73) Assignee: Fuji Seal International, Inc., Osaka (JP)

( * ) Notice: Subject to any disclaimer, the term of this patent is extended or adjusted under 35 U.S.C. 154(b) by 1068 days.

(21) Appl. No.: 10/590,963

(22) PCT Filed: Feb. 4, 2005

(86) PCT No.: PCT/JP2005/001680

§ 371 (c)(1),
(2), (4) Date: Aug. 29, 2006

(87) PCT Pub. No.: WO2005/086122

PCT Pub. Date: Sep. 15, 2005

(65) Prior Publication Data

US 2007/0240806 A1    Oct. 18, 2007

(30) Foreign Application Priority Data

Mar. 8, 2004   (JP) .............................. 2004-064662
Mar. 19, 2004  (JP) .............................. 2004-081558
Dec. 9, 2004   (JP) .............................. 2004-356188

(51) Int. Cl.
*B41M 5/00*   (2006.01)
*B44C 1/17*   (2006.01)
*G03G 7/00*   (2006.01)

(52) U.S. Cl. .................... 428/195.1; 428/200; 428/201; 428/203; 428/211.1

(58) Field of Classification Search ................. 428/156, 428/158, 192, 195.1, 200, 201, 203, 211.1
See application file for complete search history.

(56) References Cited

U.S. PATENT DOCUMENTS 4,983,238 A * 1/1991 Yoshida et al. ................ 156/86
5,223,315 A * 6/1993 Katsura et al. ........... 428/36.92

FOREIGN PATENT DOCUMENTS

JP       63-212979       9/1988

(Continued)

OTHER PUBLICATIONS

Machine Translation of JP 2001-125489, Fuji Seal Inc., May 2001 (abstract, specification, claims and drawings attached hereto).*

(Continued)

*Primary Examiner*—Mark Ruthkosky
*Assistant Examiner*—David J Joy
(74) *Attorney, Agent, or Firm*—Sterne, Kessler, Goldstein & Fox P.L.L.C.

(57) ABSTRACT

The heat-shrinkable cylindrical label of the invention comprises a laminated substrate made of two or more layers which have an outer layer sheet and an inner layer sheet. In one side end section of this label substrate, an outer layer sheet exposure section having no inner layer sheet is formed. This outer layer sheet exposure section is overlapped with the other end section of the front face of the label substrate to form a center seal section. In such a heat-shrinkable cylindrical label, the center seal section can be formed without interposing the inner layer sheet. Accordingly, the center seal section does not become thick. Thus, a heat-shrinkable cylindrical label having a beautiful external appearance can be provided.

9 Claims, 20 Drawing Sheets

FOREIGN PATENT DOCUMENTS

| | | |
|---|---|---|
| JP | 8106252 | 4/1996 |
| JP | 8301312 | 11/1996 |
| JP | 10-291252 | 11/1998 |
| JP | 3059623 | 3/1999 |
| JP | 2001125489 | 5/2001 |
| JP | 2001-271022 | 10/2001 |
| JP | 2003-160180 | 6/2003 |
| JP | 2003335343 | 11/2003 |
| JP | 2005055490 | 3/2005 |
| JP | 2005099561 | 4/2005 |

OTHER PUBLICATIONS

Machine Translation of JP 2003-335343, Fuji Seal Inc., Nov. 2003 (abstract, specification, claims and drawings attached hereto).*

International Search Report for PCT/JP2005/001680 mailed May 17, 2005.

Japanese Office Action in JP 2004-064662, issued Jul. 16, 2010 with partial English translation thereof, 5 pgs.

Japanese Office Action in JP 2004-081558, issued Jul. 16, 2010 with partial English translation thereof, 5 pgs.

* cited by examiner

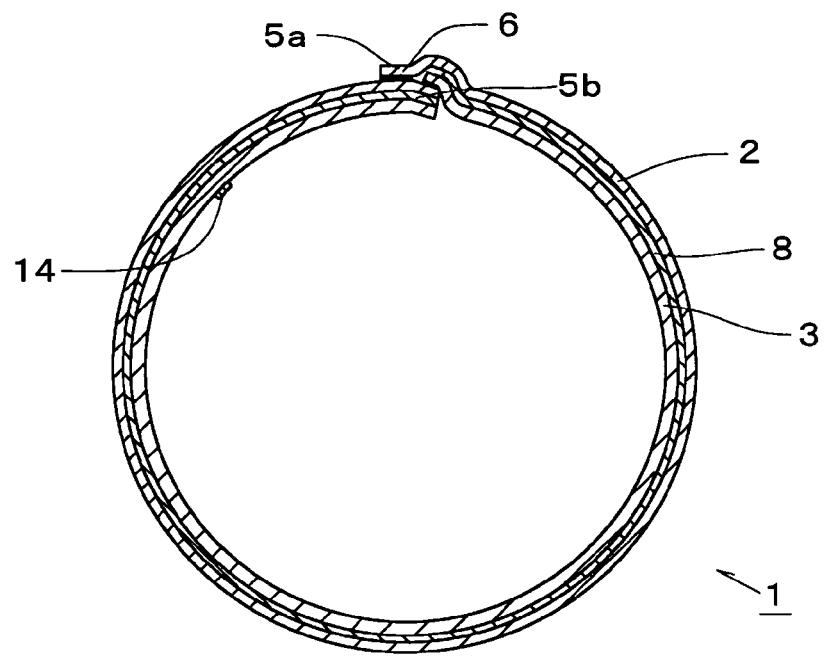
F I G. 9(a)
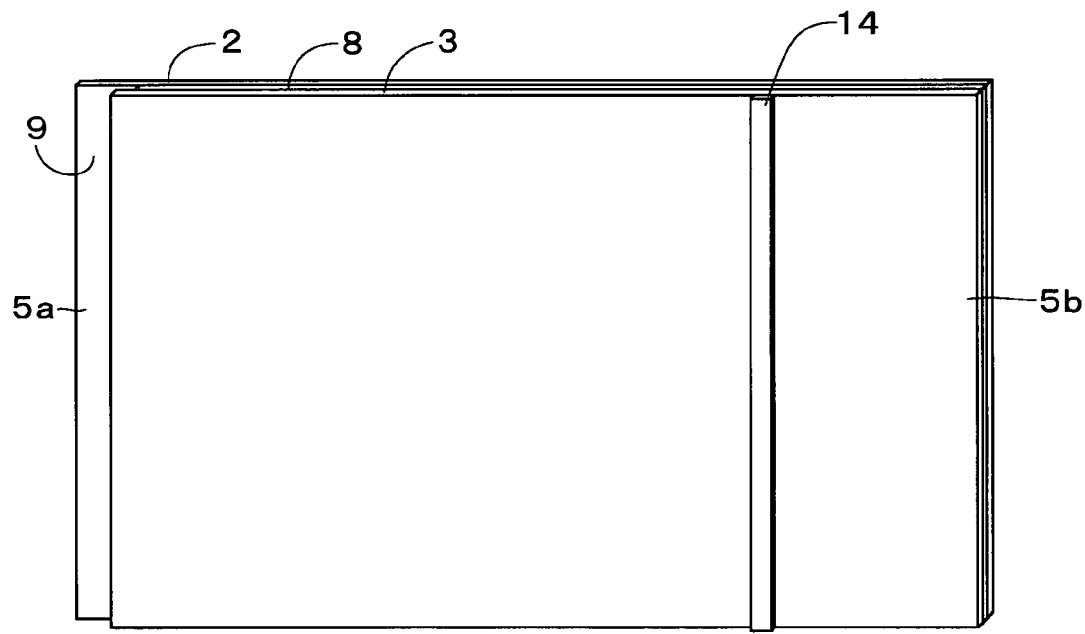
F I G. 9(b)

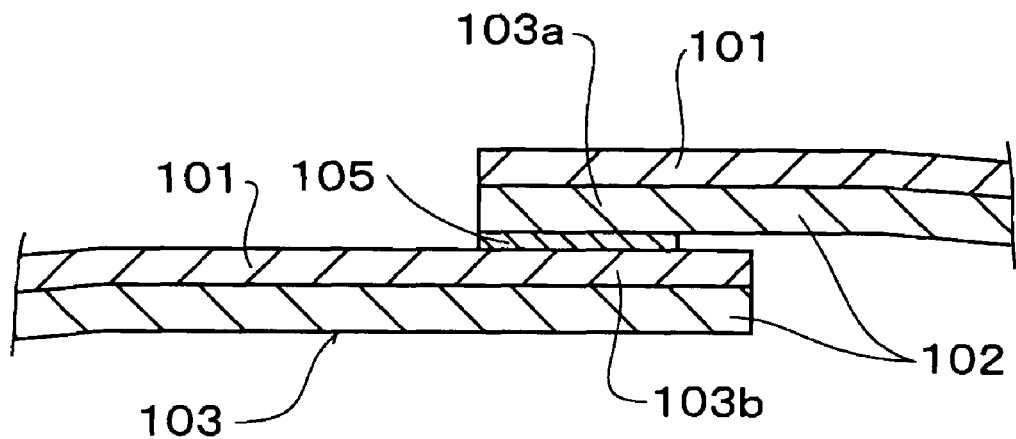
F I G. 2 0 (a)
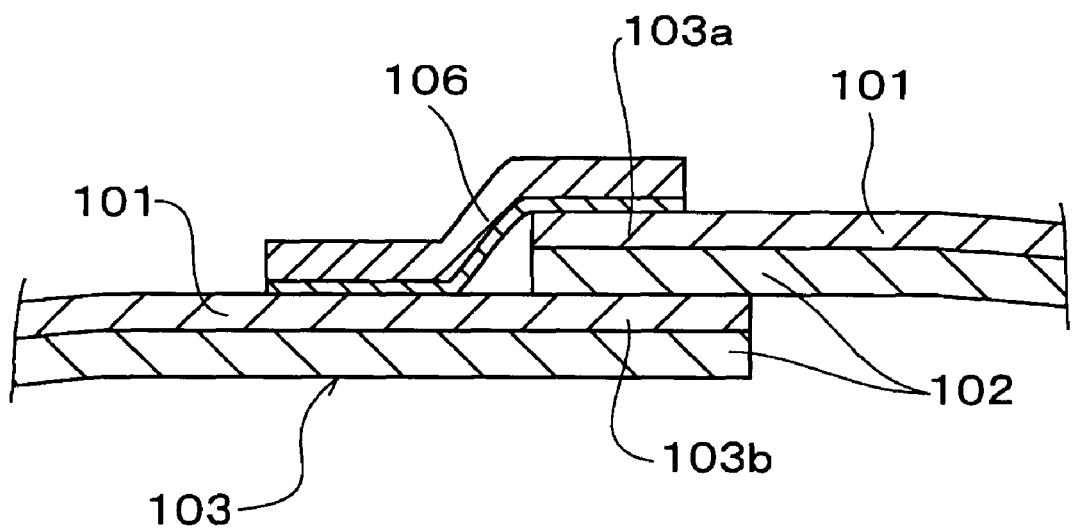
F I G. 2 0 (b)

HEAT-SHRINKABLE CYLINDRICAL LABEL

BACKGROUND OF THE INVENTION

1. Field of the Invention

The present invention relates to a heat-shrinkable cylindrical label which is attached to a container or the like by heat shrinkage, and a method of producing a longitudinal cylindrical label continuum wherein the cylindrical label is continuously extend sectioned.

2. Background Art

Heat-shrinkable cylindrical labels (shrinkable labels each formed into a cylindrical form) are used in the state that they are attached to containers such as drink bottles or cosmetic containers.

Such a heat-shrinkable cylindrical label is made of a label substrate which has a sheet (generally called a film in some cases) made of a synthetic resin and having heat shrinkability. Both side end sections of this label substrate are overlapped with each other, and the overlapped portions are stuck onto each other, thereby forming a center seal section.

As this label substrate, there are used substrates of various kinds, examples of which include not only a substrate having a mono-layered structure of a sheet having heat shrinkability but also a substrate having a laminated structure wherein two or more sheets are laminated. As an example wherein a laminate is used as a label substrate, Japanese Patent Application Laid-Open (JP-A) No. 8-106252 describes a heat-shrinkable cylindrical label wherein a label substrate which comprises a heat-shrinkable sheet (represented as a heat-shrinkable film in the same publication) and a foamed resin sheet (represented as a heat-shrinkable foamed sheet in the publication) laminated onto the heat-shrinkable sheet is made into a cylindrical form, and then a center seal section is formed. In this heat-shrinkable cylindrical label, the laminated foamed resin sheet has heat insulating effect. Accordingly, even if a container or the like to which this cylindrical label is attached is heated or cooled, the heat of the container or the like is not easily conducted to the user. Thus, the label is a preferred label.

The structure of a center seal section of such a heat-shrinkable cylindrical label, which is made of a laminate, is described in the above-mentioned publication. Specifically, the following structures are disclosed: as illustrated in FIG. 20(a) attached, a structure wherein the rear face of a foamed resin sheet 102 at one side end section 103a of the laminate is overlapped with the front face of a heat-shrinkable sheet 101 at the other side end section 103b, and the overlapped faces are stuck onto each other through an adhesive 105; and as illustrated in FIG. 20(b), a structure wherein the rear face of a foamed resin sheet 102 at one side end section 103a is overlapped with the front face of a heat-shrinkable sheet 101 at the other side end section 103b, and the overlapped faces are stuck onto each other with a tape 106.

However, when the rear face of the one side end section 103a of the label substrate 103 is overlapped with the front face of the other side end section 103b and the faces are stuck to each other through the adhesive 105, portions of the foamed resin sheet 102 are overlapped with each other in the vertical direction in the resultant center seal section so that the center seal section becomes very thick. As a result, when the cylindrical label continuum wherein the cylindrical label is continuously extended is wound into a roll form, there is caused a problem that the length of the winding becomes short. Furthermore, after the cylindrical label is attached to a container or the like by heat shrinkage, a site which partially swells into a large thickness is generated in the longitudinal direction of the cylindrical label.

The structure shown in FIG. 20(a) also has a problem that: the adhesive 105 is coated onto the foamed resin sheet 102; thus, if the amount of the adhesive is small, a sufficient adhesive strength is not obtained at ease. Additionally, the side edge of the foamed resin layer becomes oblique so as to be exposed to the outside when this label is attached to a product by shrinkage. For this reason, the external appearance of the product to which the label is attached is bad.

About a label having portions stuck to each other with a tape, as illustrated in FIG. 20(b), at the time of performing center sealing, it is essential to adjust or match tensile tensions or forwarding-timings of a tape 106 and a label substrate 103 skillfully. Thus, the adjustment is complicated.

These matters are not problems limited to laminates wherein a foamed resin sheet is laminated onto a heat-shrinkable sheet. For example, similar problems are caused in the case of using a label substrate wherein a nonwoven cloth, Japanese paper or the like is laminated. Furthermore, when the material of a heat-shrinkable sheet is different from that of a foamed resin sheet or nonwoven cloth, the two may be unable to be stuck to each other with a solvent.

The present invention has been made in order to provide: a heat-shrinkable cylindrical label comprising an inner layer sheet laminated onto the rear face of an outer layer sheet, the label being characterized by being improved in such a manner that its center seal section does not become thick; and a method of producing this cylindrical label continuum. A further object of the invention is to provide a heat-shrinkable cylindrical label which exhibits a beautiful external appearance after this label is attached to a product by shrinkage.

BRIEF SUMMARY OF THE INVENTION

The present invention provides a heat-shrinkable cylindrical label, wherein both side end sections of a label substrate comprising an inner layer sheet laminated onto the rear face of an outer layer sheet having heat-shrinkability are overlapped with each other to make the label substrate into a cylindrical form, thereby forming a center seal section, and wherein an outer layer sheet exposure section having no inner layer sheet is formed in the rear face of the one side end section of the label substrate, and the outer layer sheet exposure section and the front face of the other side end section of the label substrate are overlapped with each other, and stuck to each other with a solvent or an adhesive.

In this cylindrical label, the outer layer sheet exposure section, which has no inner layer sheet, is overlapped with the front face of the other side end section of the label substrate, thereby forming a center seal section. Thus, in the center seal section, portions of the inner layer sheet are not overlapped in the vertical direction with each other so that the center seal section can be prevented from becoming thick. Accordingly, after the label is attached to a product by shrinkage, the center seal section does not swell and further the inner layer sheet does not protrude from the outer edge of the center seal section. Thus, the external appearance of the attached label becomes beautiful.

Furthermore, the outer layer sheet exposure section and the front face of the other side end section of the label substrate (that is, the front face of the outer layer sheet) are overlapped with each other; consequently, the faces of the outer layer sheet contact with each other. Thus, when the faces are stuck to each other with a solvent or adhesive, the faces can be certainly stuck to each other at ease. Moreover, the center seal section does not become too hard since the adhesive or the like is stuck to the inner layer sheet.

The invention also provides a heat-shrinkable cylindrical label, wherein both side end sections of a label substrate comprising an inner layer sheet laminated, through an adhesive layer, onto the rear face of an outer layer sheet having heat-shrinkability are overlapped with each other to make the label substrate into a cylindrical form, thereby forming a center seal section, and wherein one side edge of the inner layer sheet is arranged inside one side edge of the outer layer sheet and further one side edge of the adhesive layer is arranged inside the one side edge of the inner layer sheet, whereby an outer layer sheet exposure section is formed in the rear face of one of the side end sections of the label substrate, and the outer layer sheet exposure section and the front face of the other side end section of the label substrate are overlapped with each other and stuck to each other with a solvent or an adhesive. The wording "is arranged inside" means "is arranged at the side of the center in the width direction of the label substrate".

About this cylindrical label also, the center seal section neither becomes thick nor hard, and the center seal section can easily be formed in the same manner as about the above-mentioned cylindrical label.

The one side edge of the inner layer sheet, out of the layers laminated onto the rear face of the outer layer sheet, is arranged inside the one side edge of the outer layer sheet, and further the one side edge of the adhesive layer is arranged inside the one side edge of the inner layer sheet; thus, the thickness of the label substrate is small in the one side end section, and the thickness becomes larger step by step inward from this one side end section. Accordingly, the external form of the cylindrical label which is extended inward from the center seal section comes to have a relatively gentle line or curved line. For this reason, a cylindrical label having a beautiful circumferential face shape can be provided.

The invention also provides a heat-shrinkable cylindrical label, wherein both side end sections of a label substrate in which a design printed layer and an inner layer sheet are laminated in this order onto the rear face of an outer layer sheet having heat-shrinkability are overlapped with each other to make the label substrate into a cylindrical form, thereby forming a center seal section, and wherein one side edge of the design printed layer is arranged inside one side edge of the outer layer sheet and further one side edge of the inner layer sheet is arranged inside the one side edge of the design printed layer, whereby an outer layer sheet exposure section is formed in the rear face of the one side end section of the label substrate, and the outer layer sheet exposure section and the front face of the other side end section of the label substrate are overlapped with each other and stuck to each other with a solvent or an adhesive.

About this cylindrical label also, the center seal section neither becomes thick nor hard, and the center seal section can easily be formed in the same manner as about the above-mentioned cylindrical label. Furthermore, the one side edge of the inner layer sheet is hidden by the design printed layer since the one side edge of the design printed layer is arranged outside the inner layer sheet. Accordingly, the inner layer sheet is not seen through the circumferential face of the cylindrical label. Thus, the external appearance of the attached label becomes more beautiful.

The invention also provides a heat-shrinkable cylindrical label, wherein both side end sections of a label substrate in which a design printed layer, an adhesive layer and an inner layer sheet are laminated in this order onto the rear face of an outer layer sheet having heat-shrinkability are overlapped with each other to make the label substrate into a cylindrical form, thereby forming a center seal section, and wherein one side edge of the design printed layer is arranged inside one side edge of the outer layer sheet, one side edge of the adhesive layer is arranged inside the one side edge of the design printed layer, and further one side edge of the inner layer sheet is arranged between the one side edge of the design printed layer and the one side edge of the adhesive layer, whereby an outer layer sheet exposure section is formed in the rear face of the one side end section of the label substrate, and the outer layer sheet exposure section and the front face of the other side end section of the label substrate are overlapped with each other and stuck to each other with a solvent or an adhesive.

About this cylindrical label also, the center seal section neither becomes thick nor hard, and the center seal section can easily be formed in the same manner as about the above-mentioned cylindrical label. Three layers of the design printed layer, the adhesive layer and the inner layer sheet are at least formed on the rear face of the outer layer sheet, so that the thickness of the label substrate becomes larger than that of the above-mentioned cylindrical label; however, the respective layers are formed to be shifted inwards step by step. Accordingly, the external form of the cylindrical label comes to have a relatively gentle line or curved line. Thus, a cylindrical label having a beautiful circumferential face shape can be provided.

According to a preferred embodiment, provided is the heat-shrinkable cylindrical label in which in the center seal section the side edge of the inner layer sheet in the other side end section of the label substrate is positioned outside the side edge of the inner layer sheet in the one side end section of the label substrate. In the heat-shrinkable cylindrical label of this preferred embodiment, portions of the inner layer sheet are not overlapped with each other in the vertical direction not only in the center seal section but also in the whole of the section where both the side end sections of the label substrate are overlapped with each other. It is therefore possible to prevent certainly the generation of any thick portion where one portion of the cylindrical label swells.

In preferred embodiments, provided are the heat-shrinkable cylindrical label wherein the inner layer sheet comprises a sheet having heat insulating property, the heat-shrinkable cylindrical label wherein the inner layer sheet comprises a foamed resin sheet, and the heat-shrinkable cylindrical label wherein the inner layer sheet comprises a nonwoven cloth. The heat-shrinkable cylindrical labels of these preferred embodiments each have heat insulating property. In many cases, a sheet having heat insulating property generally has a large thickness. However, in the invention, wherein portions of the inner layer sheet are not overlapped with each other in the vertical direction in the center seal section, the center seal section can be prevented from swelling even if such a sheet having heat insulating property is used as the inner layer sheet.

According to a preferred embodiment, provided is the heat-shrinkable cylindrical label which has a container-contacting face on which a heat-sensitive adhesive is coated. In the heat-shrinkable cylindrical label of this preferred embodiment, the heat-sensitive adhesive does not exhibit adhesive property before the label is heated to a given temperature. On the other hand, when the label is inserted and fitted into a container and subsequently this label is heated to the given temperature so as to be thermally shrunken, the heat-sensitive adhesive coated on the container-contacting face expresses adhesive property. As a result, some parts of the container-contacting face of the cylindrical label adhere to the container through the heat-sensitive adhesive. Thus, the cylindrical label and the container are certainly bonded closely to each other, so that the cylindrical label can be prevented from skidding onto the container.

The invention also provides method of producing a heat-shrinkable cylindrical label continuum wherein: an outer layer sheet exposure section is formed in the rear face of one side end section of a label substrate continuum in which an inner layer sheet is laminated onto an outer layer sheet having heat-shrinkability; this label substrate continuum is made into a cylindrical form; and the outer layer sheet exposure section and the front face of the other side end section of the label substrate continuum are overlapped with each other, and stuck to each other with a solvent or an adhesive; the method comprising: the step of printing a design printed layer onto the rear face of the outer layer sheet except an area which corresponds to the outer layer sheet exposure section formed in one side end section of the rear face; the step of coating an adhesive so as to position one side edge of an adhesive layer inside one side edge of the design printed layer; the step of sticking the inner layer sheet so as to position one side edge of the inner layer sheet between the one side edge of the design printed layer and the one side edge of the adhesive layer; and the step of sticking the outer layer sheet exposure section and the front face of the outer layer sheet of the resultant label substrate continuum to each other with the solvent or the adhesive, thereby forming the resultant continuum into a cylindrical form.

This cylindrical label continuum producing method makes it possible to produce certainly a label substrate continuum wherein an outer layer sheet exposure section is kept and layers are shifted step by step.

The invention also provides the method of producing a heat-shrinkable cylindrical label continuum, which comprises, immediately before the inner layer sheet sticking step, the step of cutting one side end section of an inner layer sheet original in the longitudinal direction thereof, thereby forming the inner layer sheet for the sticking.

The invention also provides a method of producing a heat-shrinkable cylindrical label continuum wherein: an outer layer sheet exposure section is formed in the rear face of one side end section of a label substrate continuum in which an inner layer sheet is laminated onto an outer layer sheet having heat-shrinkability; this label substrate continuum is made into a cylindrical form; and the outer layer sheet exposure section and the front face of the other side end section of the label substrate continuum are overlapped with each other, and stuck to each other with a solvent or an adhesive; the method comprising: the step of printing a design printed layer onto the rear face of the outer layer sheet except an area which corresponds to the outer layer sheet exposure section formed in one side end section of the rear face; the step of coating an adhesive so as to position one side edge of an adhesive layer inside one side edge of the design printed layer; the step of sticking and laminating an inner layer sheet original onto the adhesive layer, and subsequently cutting one side end section of the inner layer sheet original, in the longitudinal direction thereof, between the one side edge of the design printed layer and the one side edge of the adhesive layer; and the step of sticking the outer layer sheet exposure section and the front face of the outer layer sheet of the resultant label substrate continuum to each other with the solvent or the adhesive, thereby forming the resultant continuum into a cylindrical form.

The invention also provides a method of producing a heat-shrinkable cylindrical label continuum wherein: an outer layer sheet exposure section is formed in the rear face of one side end section of a label substrate continuum in which an inner layer sheet is laminated onto an outer layer sheet having heat-shrinkability; this label substrate continuum is made into a cylindrical form; and the outer layer sheet exposure section and the front face of the other side end section of the label substrate continuum are overlapped with each other, and stuck to each other with a solvent or an adhesive; the method comprising: the step of using an outer layer sheet original having a given width as one unit and printing a design printed layer onto the rear face of the outer layer sheet original except an area which corresponds to the outer layer sheet exposure section formed in both side end sections of the rear face; the step of coating an adhesive so as to position both side edges of an adhesive layer inside both side edges of the design printed layer, respectively; the step of sticking the inner layer sheet which is slightly wider than the width between both the side edges of the adhesive layer, so as to position both side edges of the inner layer sheet between both the side edges of the design printed layer and both the side edges of the adhesive layer, respectively; the step of cutting the whole in the longitudinal direction thereof at a substantially central portion in the width direction of the whole, thereby yielding the label substrate continuum; and the step of sticking the outer layer sheet exposure section and the front face of the outer layer sheet of the resultant label substrate continuum to each other with the solvent or the adhesive, thereby forming the resultant continuum into a cylindrical form.

This production method, wherein an outer layer sheet original having a given width is used as one unit, makes it possible to produce two or more lines of label substrate continuums effectively at a time.

According to a preferred embodiment of the invention, provided is the method of producing a heat-shrinkable cylindrical label continuum which comprises, immediately before the inner layer sheet sticking step, the step of cutting an inner layer sheet original, thereby forming the inner layer sheet which is slightly wider than the width between both the side edges of the adhesive layer.

The invention also provides a method of producing a heat-shrinkable cylindrical label continuum wherein: an outer layer sheet exposure section is formed in the rear face of one side end section of a label substrate continuum in which an inner layer sheet is laminated onto an outer layer sheet having heat-shrinkability; this label substrate continuum is made into a cylindrical form; and the outer layer sheet exposure section and the front face of the other side end section of the label substrate continuum are overlapped with each other, and stuck to each other with a solvent or an adhesive; the method comprising: the step of using an outer layer sheet original having a given width as one unit and printing a design printed layer onto the rear face of the outer layer sheet original except an area which corresponds to the outer layer sheet exposure section formed in both side end sections of the rear face; the step of coating an adhesive so as to position both side edges of an adhesive layer inside both side edges of the design printed layer, respectively; the step of sticking and laminating an inner layer sheet original onto the adhesive layer, and subsequently cutting both side end sections of the inner layer sheet original, in the longitudinal direction thereof, between both the side edges of the design printed layer and both the side edges of the adhesive layer; the step of cutting the whole in the longitudinal direction thereof at a substantially central portion in the width direction of the whole, thereby yielding the label substrate continuum; and the step of sticking the outer layer sheet exposure section and the front face of the outer layer sheet of the resultant label substrate continuum to each other with the solvent or the adhesive, thereby forming the resultant continuum into a cylindrical form.

According to a preferred embodiment of the invention, provided is the method of producing a heat-shrinkable cylindrical label continuum, wherein a sheet original in which plural units made of a plurality of the outer layer sheet originals, which each have the given width, are connected to each other in the width direction of the units through cutting-planned line is used to perform the above-mentioned steps separately for each of the units.

BRIEF DESCRIPTION OF THE DRAWINGS/FIGURES

Figure 4A:
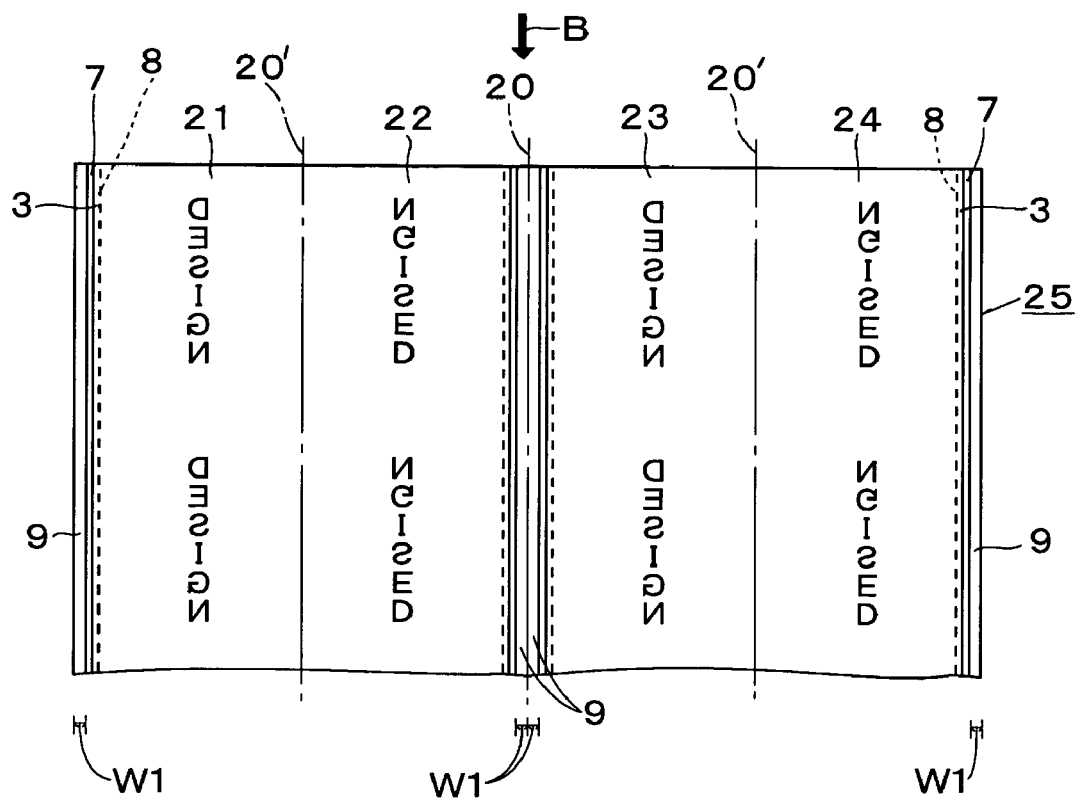
Figure 4B:
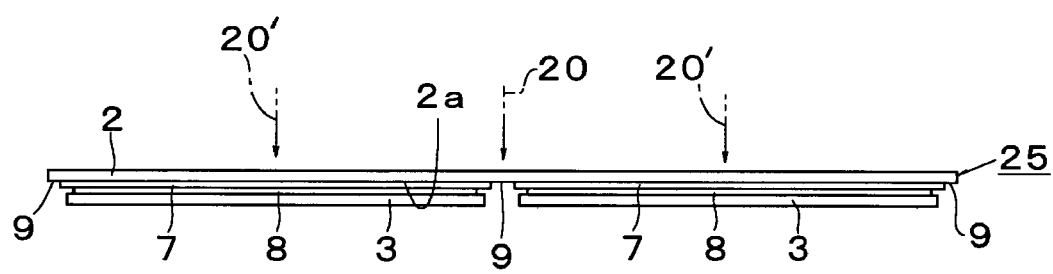
Figure 4C:
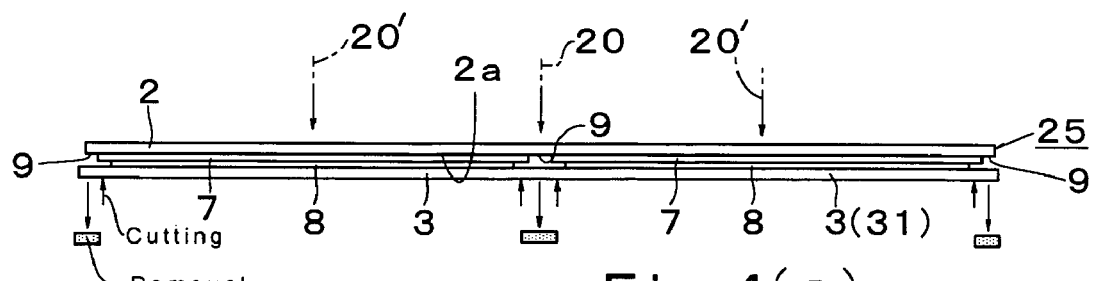

FIGS. 4(a) and (b) illustrate an embodiment of the method of producing a cylindrical label continuum, and FIG. 4(a) is a partially-omitted plan view obtained by viewing from the rear face side of a label substrate when a label substrate continuum is produced from an outer layer sheet original, FIG. 4(b) is a reference front view which is obtained by viewing along the direction of an arrow B in FIG. 4(a), and FIG. 4(c) is a reference front view illustrating a modified example of this production.

Figure 5:
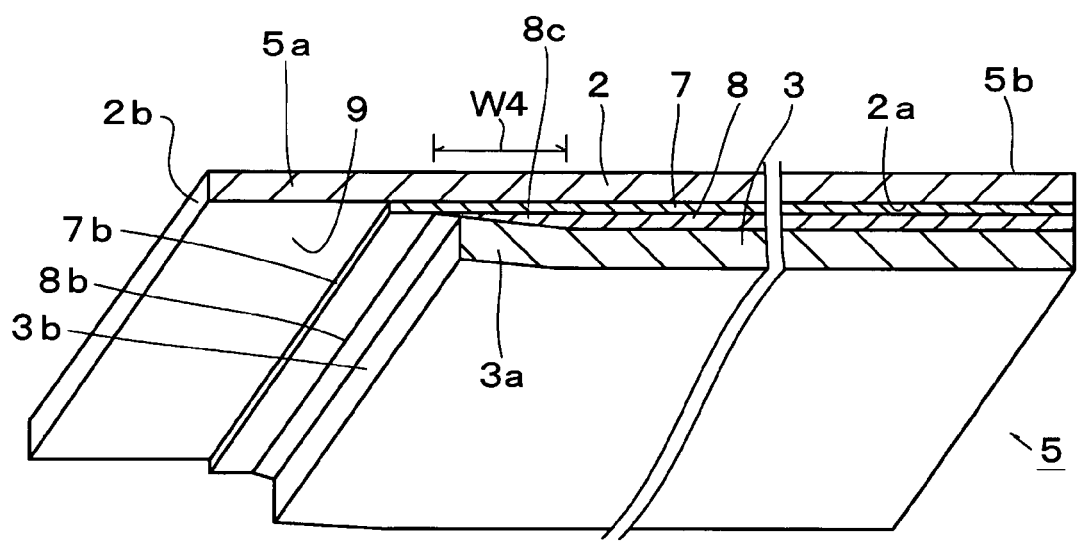

FIG. 5 is a center-omitted perspective view of a label substrate according to a different embodiment, which is obtained by viewing from the rear face side thereof, a cross section in the width direction thereof being also illustrated.

Figure 6:
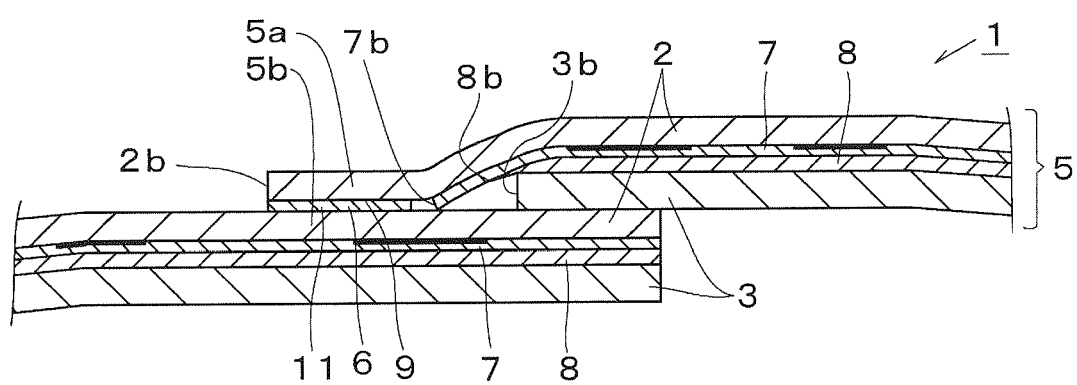

FIG. 6 is a partially-omitted sectional view of a center seal section of the cylindrical label according to the different embodiment.

Figure 7A:
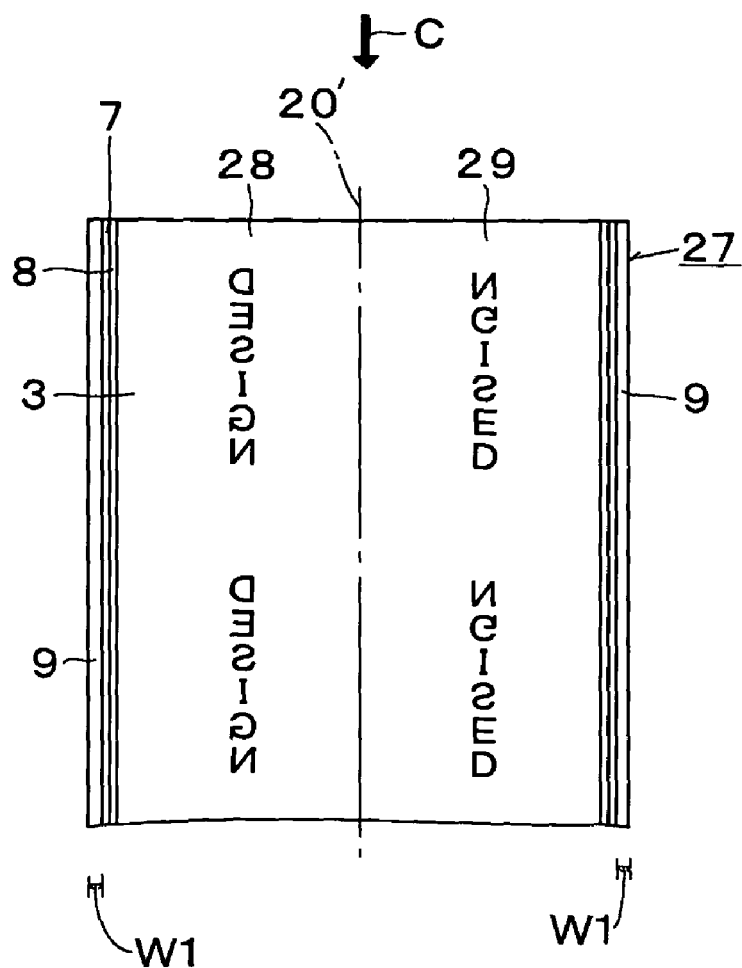
Figure 7B:
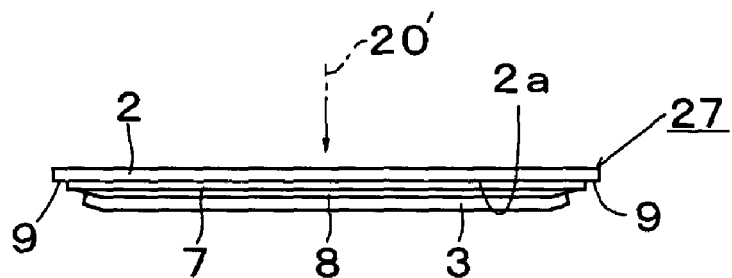

FIGS. 7(a) and (b) illustrate a method of producing a cylindrical label continuum according to a different embodiment, and FIG. 7(a) is a partially-omitted plan view obtained by viewing from the rear face side of a label substrate when a label substrate continuum is produced from an outer layer sheet original and FIG. 7(b) is a reference front view obtained by viewing along the direction of an arrow C in FIG. 7(a).

Figure 8A:
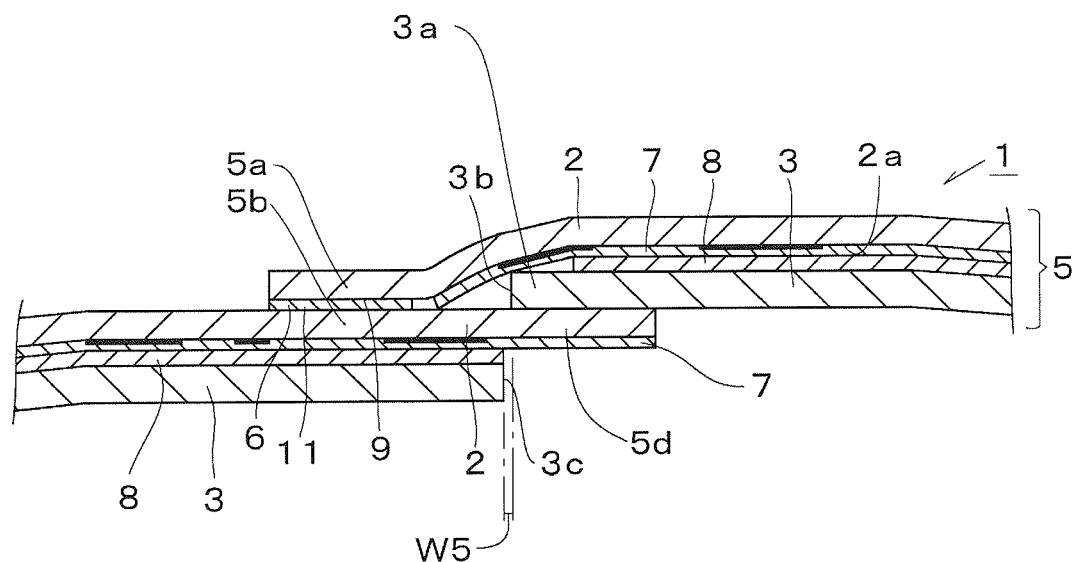

FIGS. 8(a) and (b) are partially-omitted sectional views of a center seal section of a cylindrical label according to a different embodiment.

Figure 10:
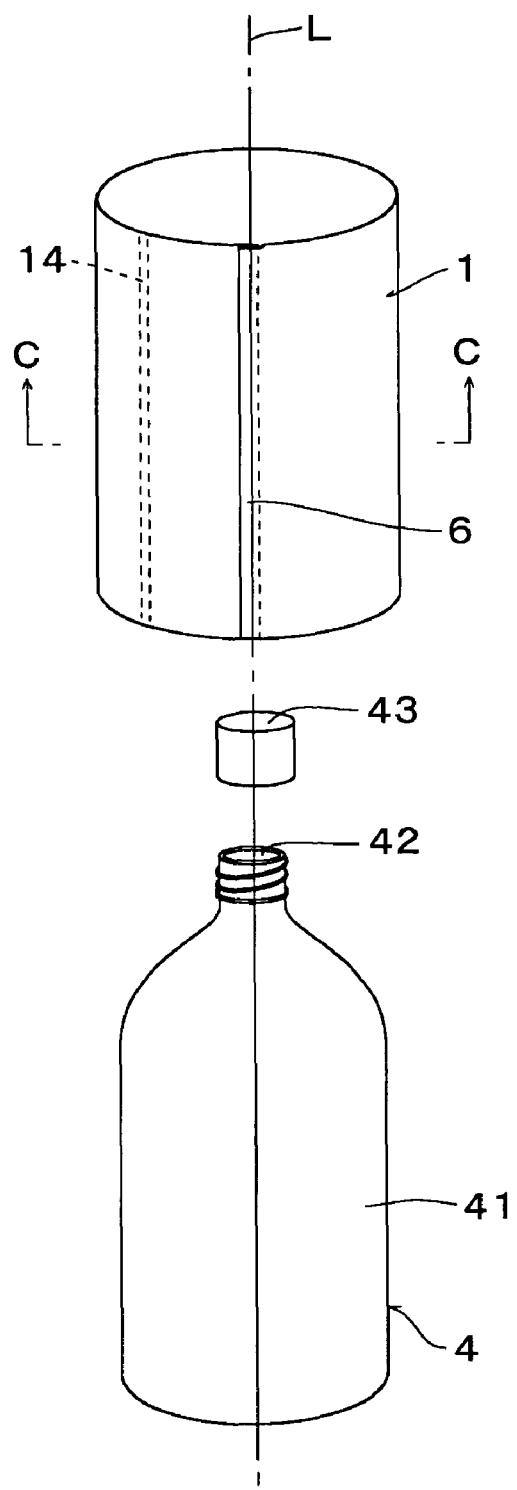

FIG. 9(a) is a sectional view (horizontal sectional view) on line C-C of FIG. 10, and FIG. 9(b) is a plan view of a label substrate used in this cylindrical label, which is obtained by viewing from the rear face side of the label substrate.

FIG. 10 is an exploded perspective view of a cylindrical label and a container with a screwed cap according to a different embodiment.

Figure 11A:
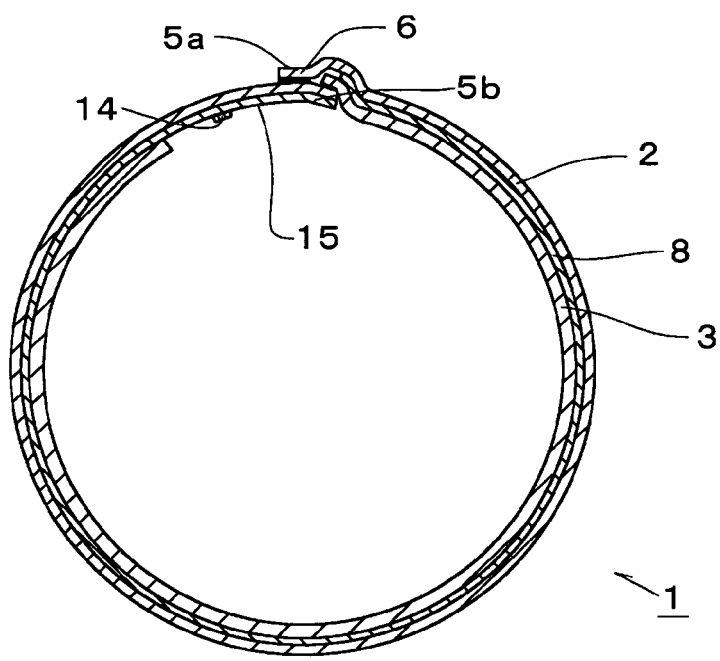
Figure 11B:
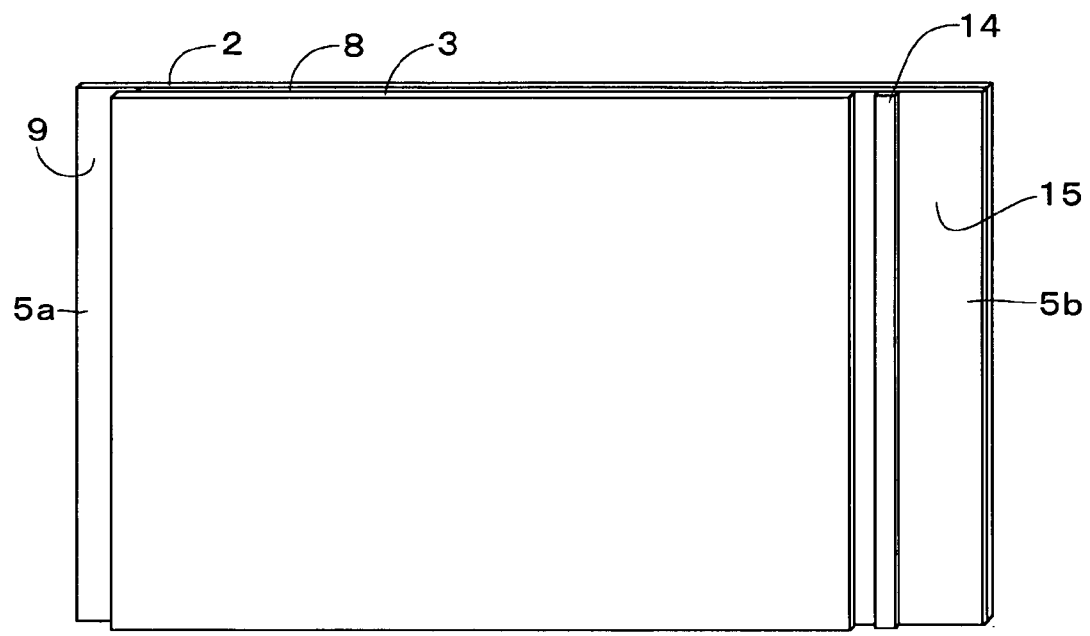

FIG. 11(a) is a horizontal sectional view of a cylindrical label according to a different embodiment, and FIG. 11(b) is a plan view of a label substrate used in this cylindrical label, which is obtained by viewing from the rear face side of the label substrate.

Figure 12A:
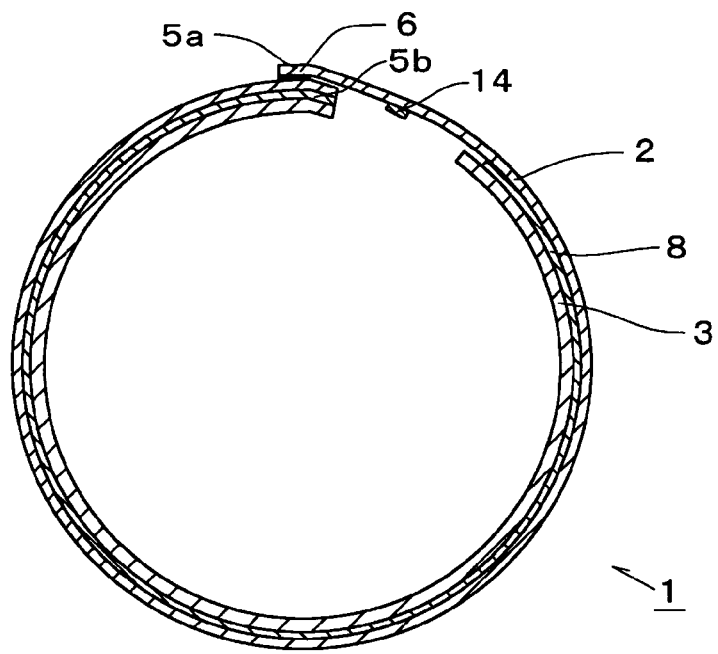
Figure 12B:
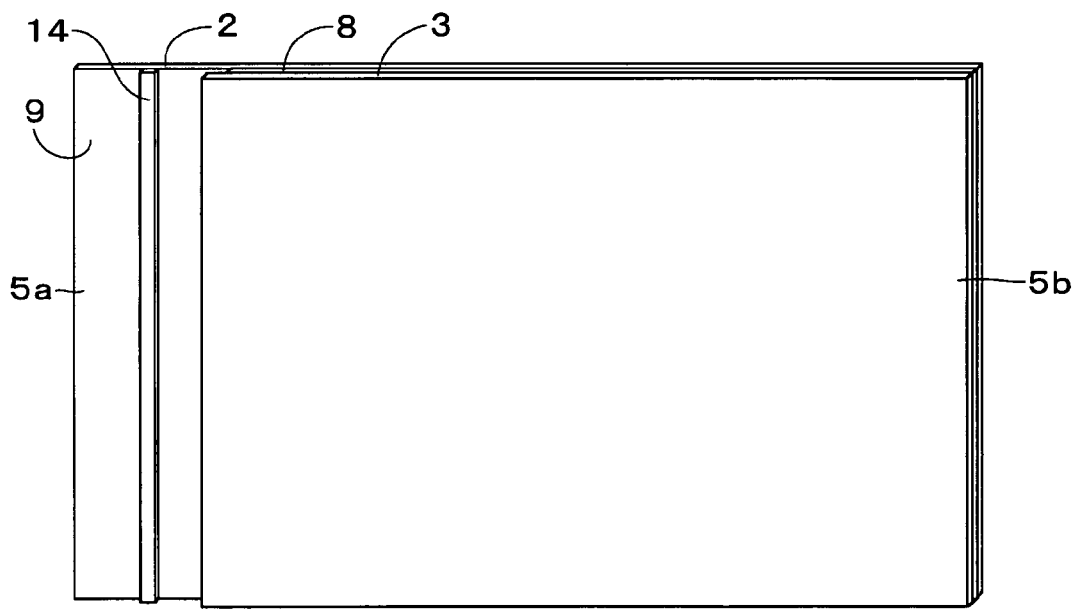

FIG. 12(a) is a horizontal sectional view of a cylindrical label according to a different embodiment, and FIG. 12(b) is a plan view of a label substrate used in this cylindrical label, which is obtained by viewing from the rear face side of the label substrate.

Figure 13A:
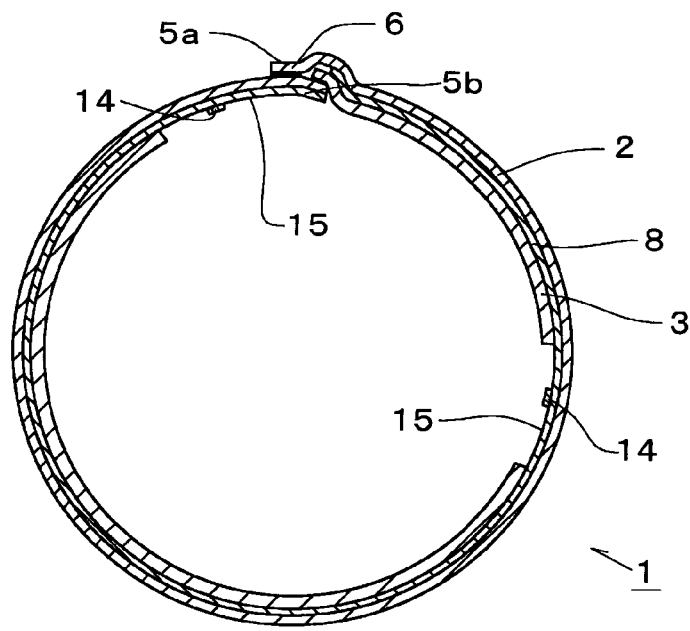
Figure 13B:
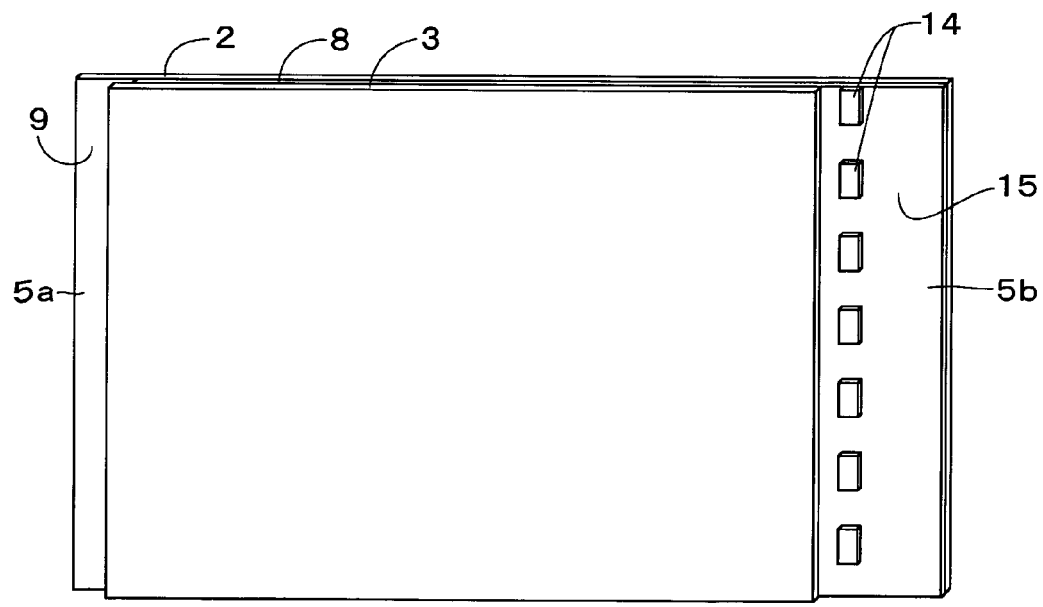

FIG. 13(a) is a horizontal sectional view of a cylindrical label according to a different embodiment, and FIG. 13(b) is a plan view of a label substrate according to the different embodiment, which is obtained by viewing from the rear face side of the label substrate.

Figure 14:
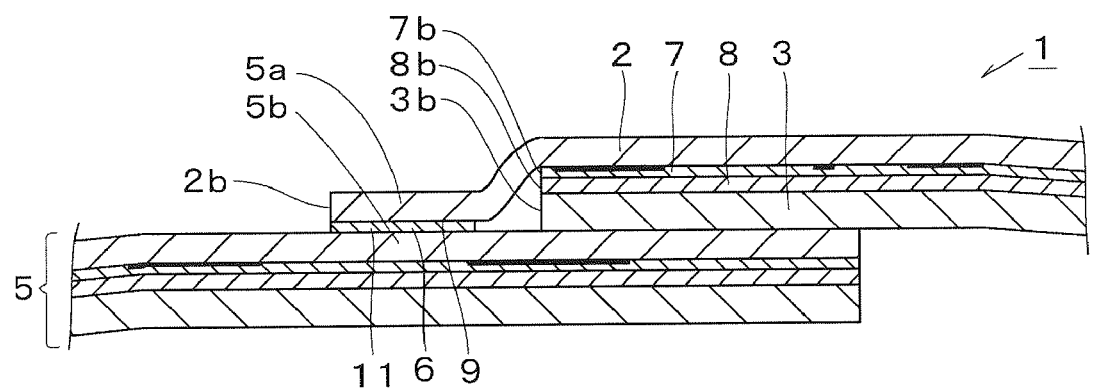

FIG. 14 is a partially-omitted sectional view of a center seal section of a cylindrical label according to a different embodiment.

Figure 15:
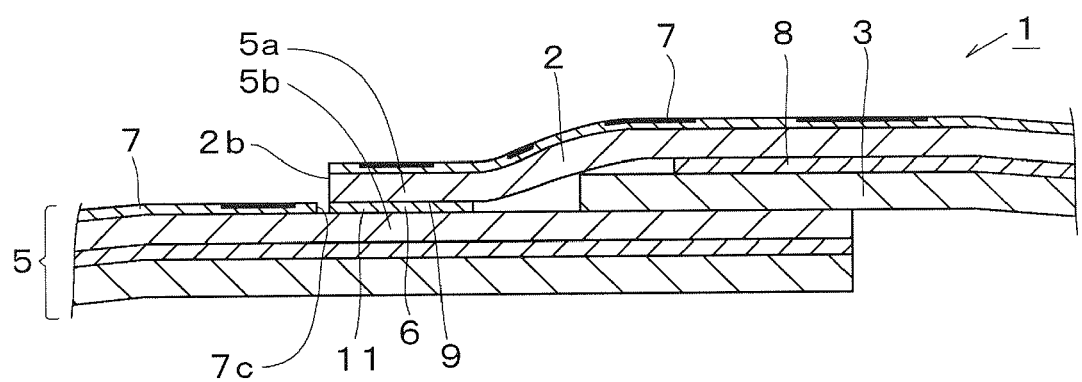

FIG. 15 is a partially-omitted sectional view of a center seal section of a cylindrical label according to a different embodiment.

Figure 16:
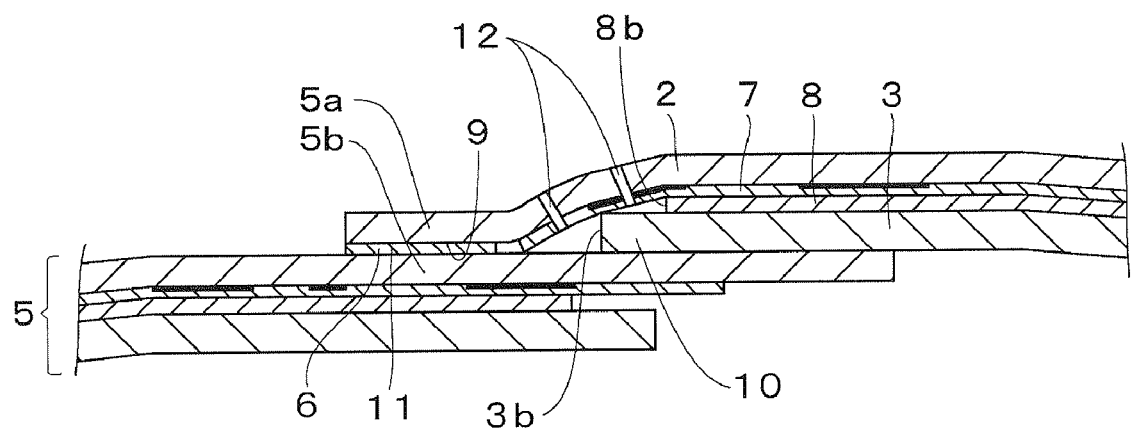

FIG. 16 is a partially-omitted sectional view of a center seal section of a cylindrical label according to a different embodiment.

Figure 17A:
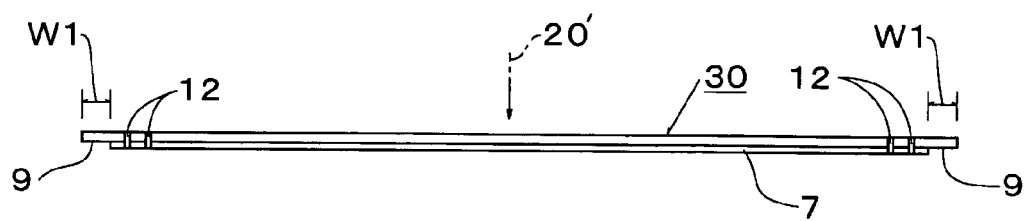
Figure 17B:
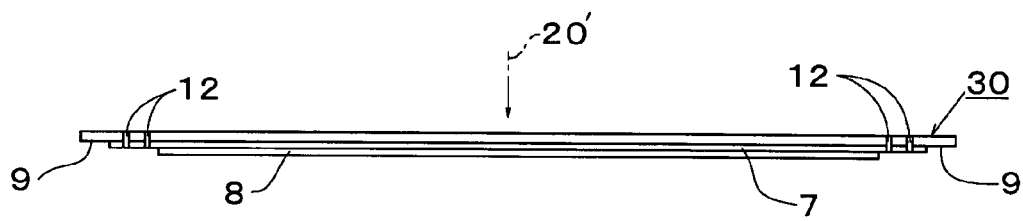
Figure 17C:
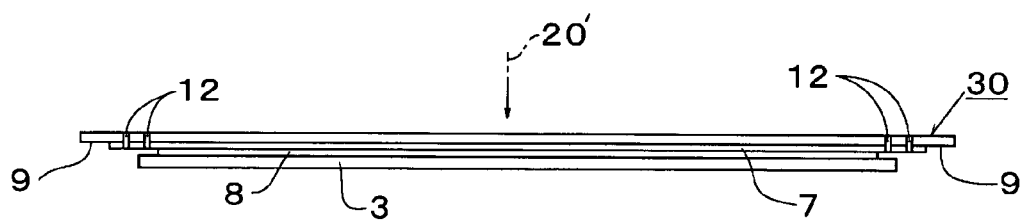

FIG. 17(a) to (c) are each a reference front view illustrating a method of producing a cylindrical label continuum according to one of the different embodiments.

Figure 18:
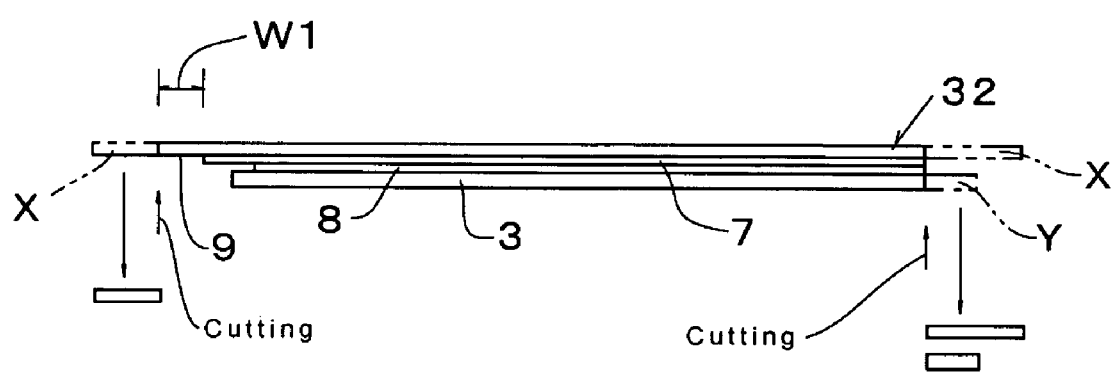

FIG. 18 is a reference front view illustrating a different embodiment of the method of producing a cylindrical label continuum.

Figure 19A:
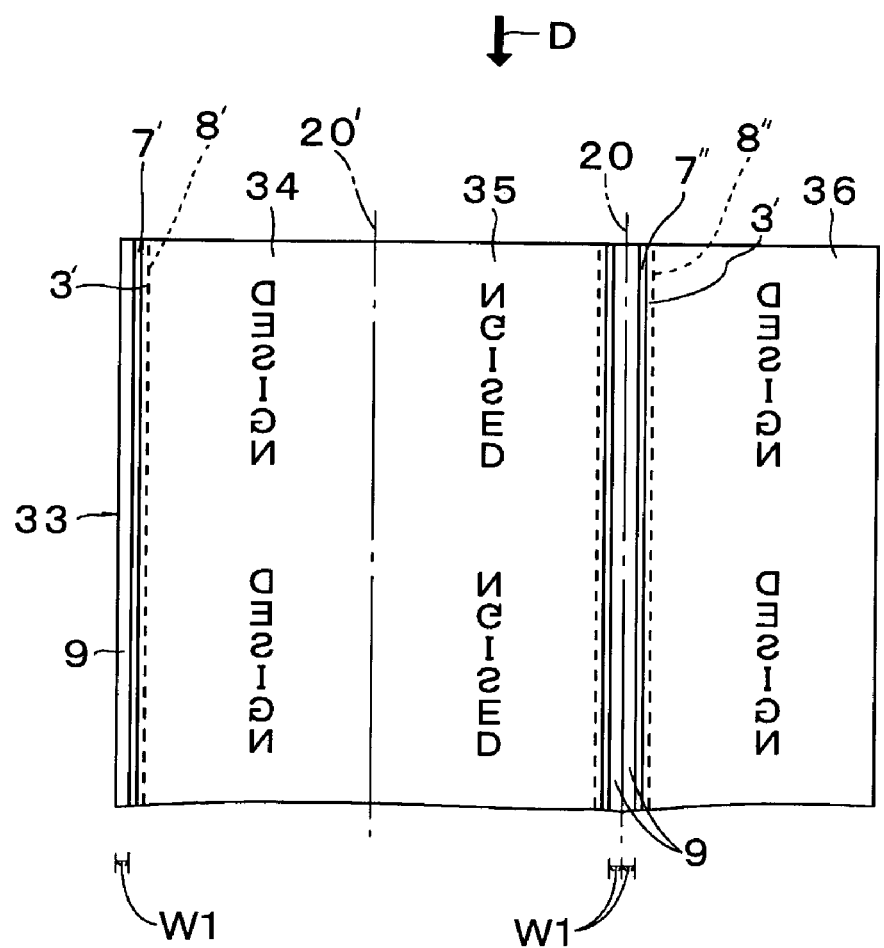
Figure 19B:
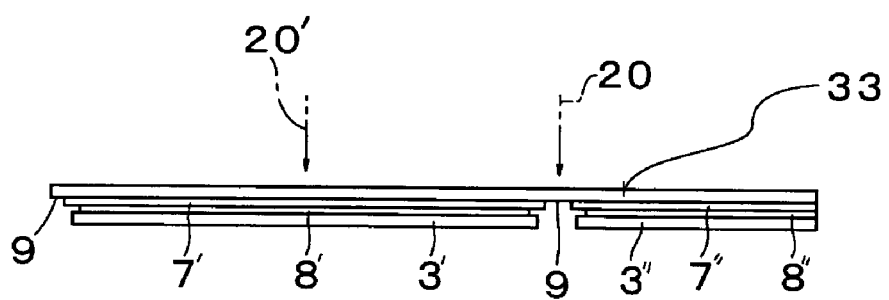

FIGS. 19(a) and (b) illustrate a different embodiment of the method of producing a cylindrical label continuum, and FIG. 19(a) is a partially-omitted plan view obtained by viewing from the rear face side of a label substrate when a substrate continuum is produced from a sheet original and FIG. 19(b) is a reference front view obtained by viewing along the direction of an arrow D in FIG. 19(a).

FIGS. 20(a) and (b) are each a partially-omitted sectional view illustrating an example of a center seal section in the prior art.

DETAILED DESCRIPTION OF THE INVENTION

The invention will be specifically described with reference to the drawings hereinafter.

First Embodiment

Figure 1:
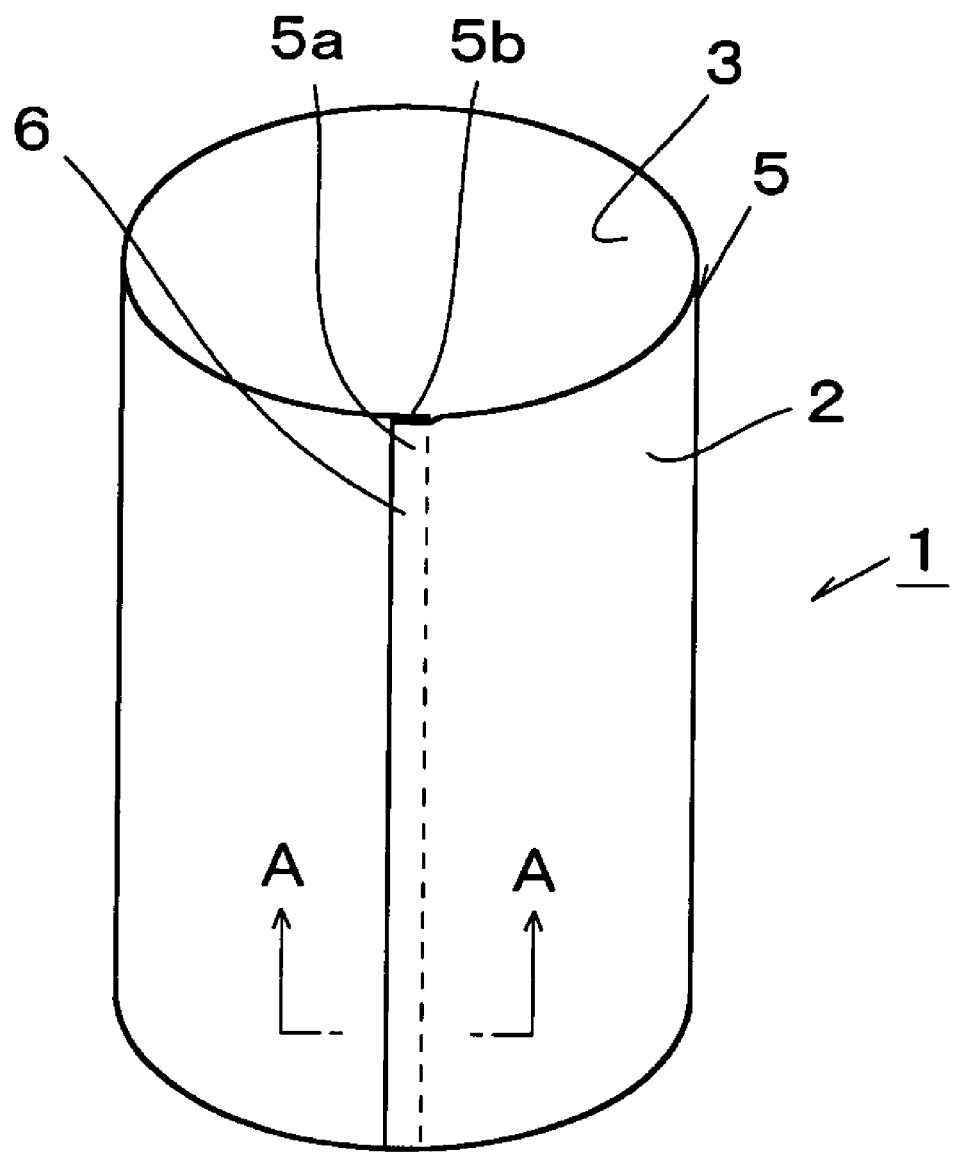
FIG. 1 is a perspective view illustrating an embodiment of the cylindrical label of the invention.
Figure 2:
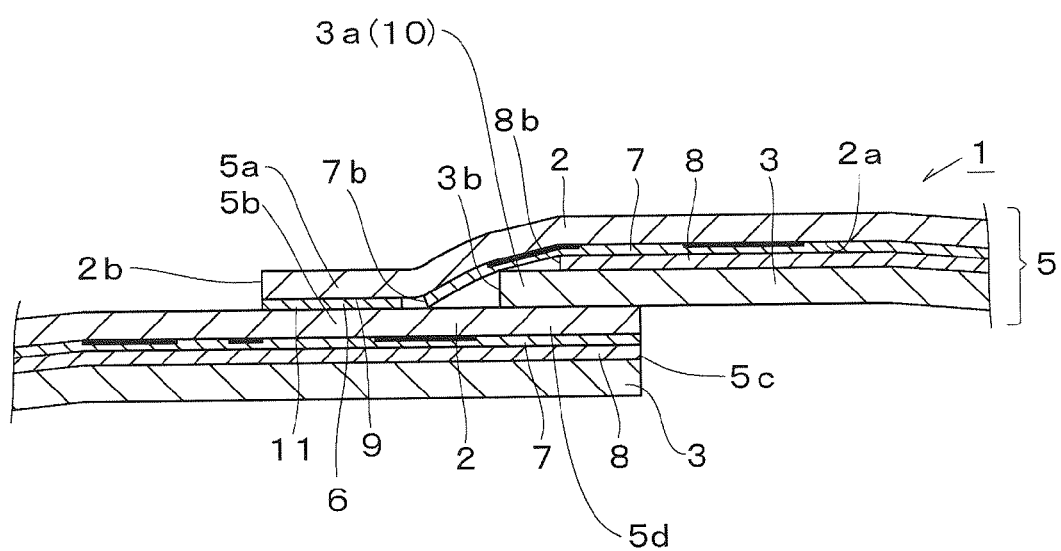
FIG. 2 is a sectional view on line A-A of FIG. 1.
Figure 3:
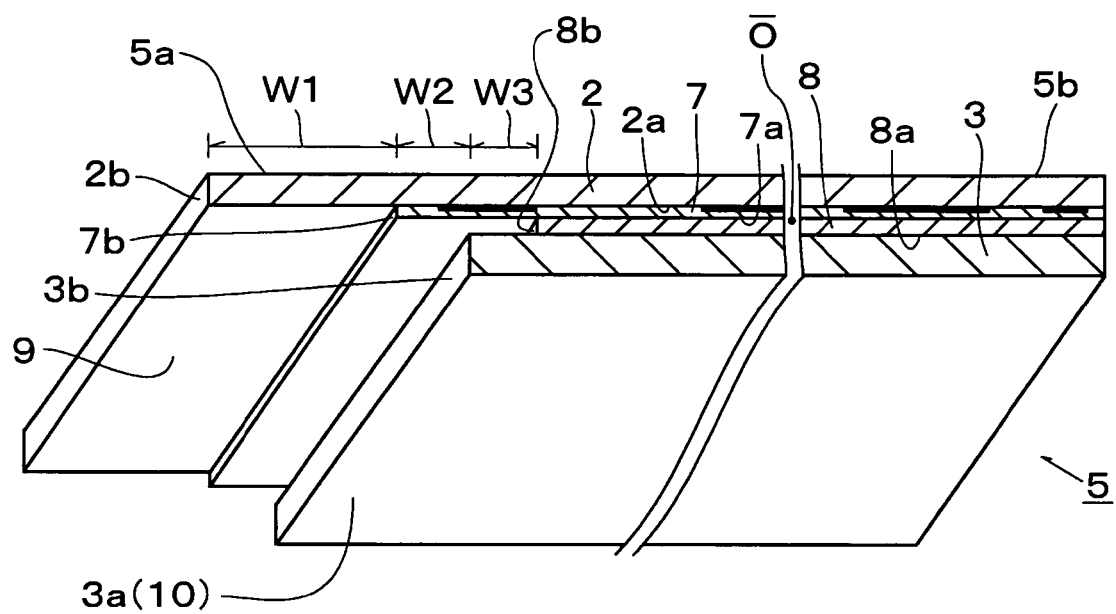
FIG. 3 is a center-omitted perspective view of a label substrate according to the embodiment, which is obtained by viewing from the rear face side thereof, a cross section in the width direction thereof being also illustrated.

In FIGS. 1 to 3, reference number 1 represents a heat-shrinkable cylindrical label formed by overlapping both side end sections 5a and 5b of a label substrate 5 wherein an inner layer sheet 3 is laminated over a rear face 2a of an outer layer sheet 2 having heat-shrinkability with each other so as to make the label substrate into a cylindrical form, and then sticking the overlapped portions to each other with a solvent or adhesive, thereby forming a center seal section 6.

This label substrate 5 has a structure wherein at least the outer layer sheet 2, a design printed layer 7, an adhesive layer 8 and the inner layer sheet 3 are successively laminated, these layers being arranged from the front face side of the label substrate 5 in the order that the layers are described.

Specifically, the label substrate 5 is formed into a rectangular form having a given width and length. As also illustrated in FIG. 3, the label substrate 5 is made of a laminate wherein the design printed layer 7 is formed on the rear face 2a of the outer layer sheet 2, the adhesive layer 8 is formed on a rear face 7a of the design printed layer 7, and the inner layer sheet 3 is formed on a rear face 8a of the adhesive layer 8.

In one side end section 5a of this label substrate 5, the design printed layer 7 is arranged in such a manner that one side edge 7b thereof is shifted inside one side edge 2b of the outer layer sheet 2 (the word "inside" means the side of a center O in the width direction of the label substrate 5, this matter being applied to the following description in the same manner). Similarly, the adhesive layer 8 is arranged in such a manner that one side edge 8b thereof is shifted inside the one side edge 7b of the design printed layer 7. Furthermore, the inner layer sheet 3 is arranged in such a manner that one side edge 3b thereof is positioned between the one side edge 7b of the design printed layer 7 and the one side edge 8b of the adhesive layer 8. Accordingly, in the rear face of the one side end section 5a of the label substrate 5, an outer layer sheet exposure section 9 having none of the inner layer sheet 3 is formed in a band form along the longitudinal direction. This outer layer sheet exposure section 9 is a section where the rear face 2a of the outer layer sheet 2 is exposed. In one side end section 3a of the inner layer sheet 3, which includes the one side edge 3b, a non-adhesive section 10 which is not stuck with the adhesive layer 8 and has a given width is formed in a band form along the longitudinal direction. In other words, the one side end section 3a of the inner layer sheet 3 is made into a free end. As illustrated in FIG. 2, the other side edge 5c of the label substrate 5 extends from the center seal section 6 to the outside (the word "outside" means sides farther away from the center O in the width direction of the label substrate 5, this matter being applied to the following description in the same manner). Accordingly, an overlap margin section 5d which is not stuck to the rear face of the one side end section 5a of the label substrate 5 is formed in a portion near the other side edge 5c of the label substrate 5.

The width W1 of the outer layer sheet exposure section 9 (the interval between the one side edge 2b of the outer layer sheet 2 and the one side edge 7b of the design printed layer 7) is not particularly limited if the width W1 is a width suitable for center sealing. For example, the width W1 is from about 2 to 7 mm. The protruding-out width W2 of the design printed layer 7 (the interval between the one side edge 7b of the design printed layer 7 and the one side edge 3b of the foamed resin layer 3) is not particularly limited, and is, for example, from about 0.5 to 4 mm, preferably from about 1 to 2.5 mm. The width W3 of the non-adhesive section 10 of the inner layer sheet 3 (the interval between the one side edge 3b of the inner layer sheet 3 and the one side edge 8b of the adhesive layer 8) is not particularly limited, and is, for example, from about 0.5 to 10 mm, preferably from about 1 to 4 mm. The width W1 and the width W2 may be longer than the above-mentioned exemplified ranges (for example, 10 mm or more).

The outer layer sheet 2 is made of a transparent and colorless or transparent colored, heat-shrinkable sheet (the word "sheet" may be called "film" in general), through which the design printed layer 7 can be seen. The material of the outer layer sheet 2 is not particularly limited, and there can be used a synthetic resin sheet made of one selected from the following or made of a mixture of two or more selected from the following: polyester resins such as polyethylene terephthalate, olefin resins such as polypropylene, styrene resins such as polystyrene, styrene-butadiene polymer, cyclic olefin resins, and vinyl chloride resins, and other thermoplastic resins. The outer layer sheet 2 may be made of a laminated sheet wherein two different sheets are laminated. In the case of laminating a heat-nonshrinkable sheet as the inner layer sheet 3, it is preferred to use, as the outer layer sheet 2, a sheet having intense shrinkage force, for example, a polyester sheet such as a polyethylene terephthalate sheet. In the case of laminating this heat-nonshrinkable inner layer sheet 3, a preferred example of the outer layer sheet 2 is a sheet wherein the shrinkage stress in the width direction (when the sheet is made into the cylindrical label 1, the circumferential direction thereof, this matter being applied to the following description in the same manner) is 8 MPa or more. This shrinkage stress in the width direction means the following value: when the sheet is cut into a piece 200 mm in length in the width direction and 15 mm in length in the longitudinal direction, both end sections in the width direction of the cut sheet piece are held with chucks of a stress tester (distance between the chucks: 50 mm) and then the sheet piece is immersed into 90° C. hot water for 10 seconds, the maximum value of the shrinkage stress, generated during the immersion, in the width direction of the sheet piece. The use of this outer layer sheet 2 makes it possible that even if the heat-nonshrinkable inner layer sheet 3 is laminated, the cylindrical label 1 is rendered a cylindrical label having, in the circumferential direction thereof, such a shrinkage stress (1 MPa or more) that the cylindrical label can be satisfactorily attached to a product by shrinkage.

The heat-shrinkable sheet which constitutes the outer layer sheet 2 can be obtained by making a film and subjecting the film to drawing treatment by a known method. The drawing treatment is usually conducted by drawing the film about 2.0 to 8.0 times, preferably about 3.0 to 7.0 times in the width direction at about 70 to 110° C. Furthermore, the film may be drawn at a low ratio of, for example, 1.5 times or less in the longitudinal direction (the direction which crosses the width direction at right angles, this matter being applied to the following description in the same manner). The resultant sheet is a mono-axially drawn sheet or a bi-axially drawn sheet wherein the direction which crosses the mainly drawn direction at right angles is somewhat drawn. The thickness of the outer layer sheet 2 is preferably from approximately 20 to 60 μm. The used outer layer sheet 2 is a sheet wherein the heat shrinkage ratio (immersion into 80° C. hot water for 10 seconds) in the width direction is 40% or more, preferably 50% or more and the heat shrinkage ratio in the longitudinal direction is from about −3 to 15%.

Heat shrinkage ratio=[{(original length in the circumferential direction (or the longitudinal direction))−(length after the immersion in the circumferential direction (or the longitudinal direction))}/(original length in the circumferential direction (or the longitudinal direction))]×100

The design printed layer 7 is made, in a single color or multi color, onto the rear face 2a of the outer layer sheet 2 by gravure-printing, for example, a given indication or design, such as a trade name, and a solid print (overall background print) in white or some other color.

The adhesive layer 8 is not particularly limited if the layer 8 is made of an adhesive capable of sticking the inner layer sheet 3 and the outer layer sheet 2 (or the design printed layer 7) with each other. An adhesive which is used in an ordinary dry laminating process or thermal lamination, or the like can be appropriately used. Examples of such an adhesive include acrylic, polyurethane, vinyl acetate, vinyl chloride, rubber and other solvent-adhesives; water-soluble adhesives; and heat-sensitive adhesives. The thickness of the adhesive layer 8 is from about 2 to 10 μm.

The inner layer sheet 3 is not particularly limited if the sheet 3 is a sheet capable of following heat shrinkage of the outer layer sheet 2 so as to be shrunken, or a sheet which can be heat-shrunken by itself. For example, a foamed resin sheet, a nonwoven cloth, a Japanese paper, a sheet having heat-shrinkability, or the like can be used.

The foamed resin sheet used as the inner layer sheet 3 is not particularly limited, and there can be used, for example, polystyrene, polyethylene, polypropylene, polyurethane or the like. It is particularly preferred to use a polystyrene based resin since the sheet has an appropriate foaming property. As the styrene based resin, there can be used a widely-used polymer made from styrene monomers, styrene-butadiene, a copolymer made from maleic anhydride, methacrylic acid or the like and styrene, or some other resin. The method for the foaming may be a known foaming method such as physical foaming or chemical foaming. If necessary, additives such as various fillers, a colorant, a plasticizer and a stabilizer can be added to these resins. Since the foamed resin sheet contains a large number of foams, the sheet exhibits white color. In order to improve the whiteness thereof, a white pigment such as titanium oxide may be added thereto.

The foamed resin sheet and the outer layer sheet 2 can be laminated and stick onto each other by dry lamination, thermal lamination, wherein a heat-sensitive adhesive is sandwiched between layers so as to stick the layers to each other, sand lamination or the like while originals, for the respective sheets, wound into a roll form are sent out. It is allowable to form the foamed resin sheet while laminating the formed sheet onto the sent-out outer layer sheet original.

The nonwoven cloth used as the inner layer sheet 3 is not particularly limited, and the following can be used: for example, a nonwoven cloth produced by making a fiber made of polyester, polypropylene, polyethylene, rayon, nylon, cupra, or the like into a sheet form by a bonding, needle-punching, span-bonding or melt blowing method, or some other method; or a Japanese-paper-like nonwoven cloth made from pulp fiber by a paper-making method. The fiber constituting the nonwoven cloth may be a solid fiber, a hollow fiber, or a mixed fiber of these fibers. It is particularly preferred to use a hollow fiber or a mixed fiber thereof since the fiber is excellent in heat insulating property. In connection with the length of the fiber, a long-fiber nonwoven cloth sheet is preferred from the viewpoint of the strength based on three-dimensionally net structure formed by the entanglement of fiber filaments or the handleability of the sheet. A short-fiber nonwoven cloth is preferred from the viewpoint of cutting-suitability of the sheet. About physical properties of the nonwoven cloth, for example, the weight per area is from about 10 to 50 g/m$^2$ (preferably from 15 to 30 g/m$^2$), the thickness is from about 80 to 200 μm, and the denier is preferably from about 2 to 5 d. Specific examples of the nonwoven cloth include "Marix [transliteration]" manufactured by Unichika, Ltd., "Bonden [transliteration]" and "Ecoole [transliteration]" manufactured by Toyobo Co., Ltd., and "Unisel [transliteration]" manufactured by Unisel Co., Ltd.

The Japanese paper used as the inner layer sheet 3 is, in a narrow sense, is a paper obtained by using a natural bast long fiber such as paper mulberry (Kouzo), paper birch (Mitsumata), or a clove-like bush (Ganpi) as a raw material, kneading this raw material, and then making the material into a paper form by hand. In the invention, examples of the Japanese paper include Japanese papers taken in a wide sense, which are obtained by making various raw materials of long fiber, such as hemp, kenaf, rayon, woody pulp and synthetic fiber, besides paper mulberry and so on, mechanically into a paper form. It is in particular preferred to use, for example, paper called "unryuu-shi" in Japanese.

As the Japanese paper 3, a paper having a weight per area of about 9 to 25 g/m$^2$ is used. If the weight per area is less than 9 g/m$^2$, the Japanese paper is too thin so that the paper may be torn at the time of laminating and sticking the paper to the outer layer sheet 2. If the weight per area is more than 25 g/m$^2$, the paper does not shrink sufficiently so as to follow heat shrinkage of the outer layer sheet 2.

The sheet used as the inner layer sheet 3, which has heat-shrinkability, is not particularly limited. For example, various heat-shrinkable sheet as exemplified as the outer layer sheet 2 can be used.

If necessary, colorants such as a pigment are added to the raw material of the sheet, whereby the inner layer sheet 3 can be appropriately colored. The colored tone is preferably a tone integrated with the design printed layer 7 from the viewpoint of design. This tone integrated with the design printed layer 7 is, for example, the same tone as the solid print of the design printed layer 7 has, or the same tone as the outer face of a container has. The use of this colored inner layer sheet 3 makes it possible that upper and lower edges of the inner layer sheet 3 are made inconspicuous in the cylindrical label 1 attached to a product. In other words, when the cylindrical label 1 is attached to a container, the outer layer sheet 2 is slightly heat-shrunken in the longitudinal direction so that the sheet 2 is shifted to be lengthwise slipped, whereby upper and lower edges of the inner layer sheet 3 may protrude in upper and lower edges of the label; however, the use of the colored inner layer sheet 3 makes it possible that even if the upper and lower edges of the inner layer sheet 3, these are visually camouflaged so as to merge the edges into the design printed layer 7 or the outer surface of the container. Thus, the external appearance of the attached cylindrical label 1 is not bad.

In the case of using, as the inner layer sheet 3, a sheet having heat insulating property such as a foamed resin sheet, the thickness of the inner layer sheet 3 is preferably 80 μm or more, more preferably 100 μm or more since a good heat insulating property can be given. As a higher heat insulating property can be given, the thickness is preferably larger. However, if the sheet is too thick, the commercial value of this label is damaged; therefore, the upper limit thereof is preferably about 500 μm or less, more preferably about 300 μm or less.

In the case of using, as the inner layer sheet 3, a foamed resin sheet, nonwoven cloth or Japanese paper, the inner layer sheet 3 may be a heat-nonshrinkable sheet, which may be a slightly heat-shrinkable sheet, since the inner layer sheet 3 can be shrunken so as to follow the heat shrinkage of the outer layer sheet 2. However, the inner layer sheet 3 used may be a heat-shrinkable inner layer sheet in order that the label can be satisfactorily attached to a container having a large difference between its diameters, such as a bottle can (a metal container having a bottle shape). As this inner layer sheet 3, for example, a foamed resin sheet having a heat shrinkage ratio of about 40 to 60% in the width direction can be used.

The center seal section 6 is formed by making the label substrate 5 into a cylindrical form to make the inner layer sheet 3 into the inner circumferential face of the cylindrical label 1, overlapping the rear face (that is, the outer layer sheet exposure section 9) of the one side end section 5a of the label substrate 5 with the front face of the other side end section 5b of the label substrate 5 in the state that the one side end section 5a is directed upwards, as illustrated in FIG. 2, and sticking the overlapped faces through a sticking agent layer 11 made of a solvent or an adhesive.

As illustrated in FIG. 2, the solvent or the adhesive 11 is coated up to the one side edge 2b of the outer layer sheet 2. In this way, the one side end section 5a of the label substrate 5 is stuck to the front face of the other side end section 5b so as to extend to the one side edge 2b of the outer layer sheet 2 (that is, the outer edge of the one side end section 5a of the label substrate 5).

For the sticking of both the side end sections 5a and 5b of the label substrate 5, a solvent or adhesive can be used as described above. However, in the case of a sheet which can be stuck with a solvent, it is preferred that the sticking of both the side end sections 5a and 5b of the label substrate 5 is stuck by using a solvent which does not contain solid contents such as a resin component since the thickness of the stuck portions can be made small and further no heat shrinkage is blocked. In the case of using, as the outer layer sheet 2, a polyester resin sheet, a polystyrene resin sheet, a sheet having front and rear faces on each of which an amorphous polyolefin resin is laminated, a vinyl chloride resin sheet or the like, one out of the following or a mixed solvent made of two or more out of the following can be used as the solvent: for example, ether solvents such as tetrahydrofuran, dioxane, and dioxolane; halogenated hydrocarbon solvents such as methylene chloride; alicyclic hydrocarbon solvents such as cyclohexane, and methylcyclohexane; ketone solvents such as acetone, methyl ethyl ketone, and methyl isobutyl ketone; ester solvents such as ethyl acetate and methyl acetate; aliphatic hydrocarbon solvents such as hexane; aromatic hydrocarbon solvents such as toluene.

The label substrate 5 and the cylindrical label 1 can be produced by, for example, the following method. The following will detail a method of producing, from one sheet original, label substrates 5 in even number (for example, four lines) all together.

As illustrated in FIGS. 4(a) and (b), in the case of supposing, as one unit, a heat-shrinkable outer layer sheet original which has a given width (a width two times the width of the label substrate 5) and which is cut on substrate cutting-planed lines 20' in the longitudinal direction, thereby making it possible to yield two lines of label substrate continuums 21 and 22, a heat-shrinkable outer layer sheet original 25 wherein two units each equivalent to this unit are connected to each other in the width direction is prepared. In other words, this outer layer sheet original 25 is a sheet original which is cut, in the longitudinal direction, on a sheet cutting-planed line 20 in the substantially central portion in the width direction and on a substrate cutting-planed line 20' of each unit through respective steps which will be described later, thereby making it possible to yield four lines of label substrate continuums 21, 22, 23 and 24.

Design printed layers 7 are formed, in the longitudinal direction, onto the rear face of this outer layer sheet original 25 by gravure printing or the like except: areas which have a width W1 corresponding to each of outer layer sheet exposure sections 9 and which extend from both side edges of the rear race of the original 25; and an area which has widths W1 and W1 corresponding to a width two times the width of each of the outer layer sheet exposure sections 9 in the central portion in the width direction of the outer layer sheet original 25. About the first and third lines (odd lines) of the label substrate continuums 21 and 23, in the design printed layers 7, indications such as its trade name are printed upwards. On the other hand, about the second and fourth lines (even lines) of the label substrate continuums 22 and 24, the design printed layers 7 are printed so as to be directed downward. In other words, in pairs of the label substrate continuums 21 and 22, . . . which are adjacent to each other across each of the substrate cutting-planed lines 20', the indications in the design printed layers 7 therein are printed in reverse directions.

Next, a gravure roll plate or the like is used to coat an adhesive onto the rear face of the printed outer layer sheet original 25 inside both side edges of each of the design printed layers 7, so as to form adhesive layers 8. Next, this outer layer sheet original 25 is introduced into a solvent collecting zone through transporting rolls to vaporize the solvent in the adhesive, thereby making the adhesive layers 8 into a semi-drying state. Separately, an inner layer sheet original fed from an inner layer sheet original roll is cut with a cutter at both side end sections of the inner layer sheet original and at a given section (a section corresponding to the widths W1 and W2 in FIG. 3) of the center portion of the origin immediately before the origin is stuck to the adhesive layers 8, so as to make the origin slightly wider than the entire width of each of the adhesive layers 8. Both side edges of each of the cut inner layer sheets are arranged to be positioned between both side edges of each of the design printed layers 7 and both side edges of each of the adhesive layers 8, respectively. The inner layer sheets 3 are stuck thereto through each of the layers 8, and the resultants are compressed with compressing rolls to laminate the inner layer sheets 3. When the step of cutting an inner layer sheet original and forming inner layer sheets, for sticking, which each have a given width in this way is performed immediately before the inner layer sheets are stuck, there is produced an advantage that the positions where the inner layer sheets are stuck are easily adjusted. This matter is described in detail. An inner layer sheet roll formed in advance to have a given width (slightly wider than each of the adhesive layers 8) is prepared; an inner layer sheet is fed out from this roll; and the inner layer sheet can be stuck in such a manner that both side edges thereof are positioned between both side edges of each of the design printed layers 7 and both side edges of each of the adhesive layers 8, respectively. The invention can be produced by this process. However, in the production, the inner layer sheet (and the outer layer sheet original) are long; therefore, in the process of feeding out the inner layer sheet, which is formed in advance to have the given width, and laminating the inner layer sheet, lateral shift (slip) is easily caused. Accordingly, in order to feed this inner layer sheet and stick this sheet to a precise position, it is necessary to conduct position adjustment frequently. As described above, however, when the inner layer sheet original is fed immediately before a position where the original is stuck and further the inner layer sheet original is stuck while the original is cut in the longitudinal direction between both side edges of each of the design printed layers 7 and both side edges of each of the adhesive layers 8, both side edges of each of the resultant inner layer sheets are positioned between both the side edges of each of the design printed layers 7 and both the side edges of each of the adhesive layers 8, respectively. Accordingly, the positions of the inner layer sheets are easily adjusted, and thus the production favorably becomes easy.

The following production process can be adopted instead of the production process of cutting the inner layer sheet original to have a given width with a cutter and then sticking the resultant inner layer sheets to the outer layer sheet 2, as described above: as illustrated in FIG. 4(c), the inner layer sheet original 31 is stuck to the outer layer sheet original 25 on which the adhesive layers 8 are formed; the inner layer sheet original 31 is then cut in the longitudinal direction between both side edges of each of the design printed layers 7 and both side edges of each of the adhesives (the cut sites are shown by arrows); and these are removed so that sheet exposure sections 9 become exposed. By this process, the inner layer sheet 3 may be laminated.

Next, the whole is cut in the longitudinal direction along the sheet cutting-planed line 20 and each of the substrate cutting-planed lines 20', thereby yielding four lines of the same label substrate continuums 21, . . . When two lines of label substrate continuums are produced at a time, an outer layer sheet original having a given width (a width two times the width of the label substrate 5) is used and the above-mentioned respective processes, such as the printing step, are performed. When six or more label substrate continuums are produced at a time, an outer layer sheet original having a given width is regarded as one unit and an outer layer sheet original wherein plural units equivalent to this unit are continuously connected to each other in the width direction across a sheet cutting-planed line 20 is used to perform the above-mentioned respective steps in the same manner.

When this label substrate continuum 21 is cut into the given length along the width direction, the single label substrate 5 is obtained. However, the resultant label substrate continuum 21 is usually wound onto a roll, and then made into the cylindrical label 1 by means of a center sealing device. According to this device, which is not particularly illustrated, the label substrate continuum 21 is pulled out while a solvent or adhesive is coated thereon along the outer layer sheet exposure sections 9; and then both the side end sections 5a and 5b are overlapped with each other and stuck to each other, thereby making the label substrate continuum 21 into a tube form. This tube form label substrate continuum 21 (that is, the cylindrical label continuum) is wound into a roll form. About the label substrate continuums 22 and 24, wherein the print directions are reverse, the same cylindrical label continuum rolls, which are wound in the same print direction, can be obtained by reverse winding.

Next, this cylindrical label continuum roll is fitted to a shrink labeler. In the labeler (cylindrical label attaching device), which is not particularly illustrated, the cylindrical label continuum is cut in the width direction at a given-length position while the continuum is fed out from the roll, thereby producing the cylindrical label 1. This is inserted and fitted into a body of a container. This container, into which the label is inserted and fitted, is fed into a shrink zone such as a shrink tunnel, and heated to a given temperature (about 80 to 100° C.) so as to shrink the cylindrical label 1 thermally, thereby making it possible to yield a label-attached container, wherein the cylindrical label 1 is fitted into the body of the container.

About this production method, dry lamination is exemplified as the laminating method therein. Other laminating methods may also be performed in the same manner. The adhesive can be coated in a solid form onto the entire face, as illustrated in the figures, or may be coated into a net form.

In the above-mentioned cylindrical label 1, the outer layer sheet exposure section 9 is formed in the rear face of the one side end section 5a of the label substrate 5. Accordingly, when this outer layer sheet exposure section 9 is overlapped with the front face of the other side end section 5b of the label substrate 5, the faces of the outer layer sheet 2 contact each other; thus, the center seal section 6 can be easily and certainly formed by coating a solvent or adhesive onto the faces. In this center seal section 6, portions of the inner layer sheet 3 do not overlap with each other, through the outer layer sheet 2, in the vertical direction. Thus, the cylindrical label does not become thick. Furthermore, the outer layer sheet 2 are bonded to each other; thus, it is possible to prevent the center seal section 6 from becoming harder than in conventional examples wherein the inner layer sheet 3 and the outer layer sheet 2 are bonded to each other. For these reasons, the cylindrical label continuum can be relatively lengthwise wound into a roll form.

Since the one side end section 5a of the label substrate 5 does not have the inner layer sheet 3, the one side edge of the inner layer sheet 3 does not protrude from the outer edge of the center seal section 6 even if the cylindrical label 1 is thermally shrunken. Thus, the outer edge of the center seal section 6 exhibits a beautiful external appearance. Furthermore, in the one side end section 5a of the label substrate 5, the design printed layer 7, the inner layer sheet 3 and the adhesive layer 8 are formed, in this order, inside the one side edge 2b of the outer layer sheet 2 so as to be slid in position. Consequently, the substrate thickness of the label substrate 5 gradually becomes thicker toward the inner portion of the substrate 5. On the basis of this structure, the label external form which extends from the center seal section 6 to the one side edge 8b of the adhesive layer 8 becomes a line or curved line having a relatively gentle inclination angle, as illustrated in FIG. 2. Consequently, a large step does not make its appearance in the surface of the cylindrical label 1, and the cylindrical label 1 after being thermally shrunken exhibits a beautiful external appearance. The one side edge 8b of the adhesive layer 8 is positioned inside the one side edge 3b of the inner layer sheet 3; it is not therefore feared that the adhesive oozes out from the one side edge 3b of the inner layer sheet 3. Thus, when the label substrate 5 is produced, the label substrate continuum can be wounded immediately after the inner layer sheet 3 is laminated. The one side edge 7b of the design printed layer 7 is arranged outside the inner layer sheet 3; therefore, the one side edge 3b of the inner layer sheet 3 is hidden by the design printed layer 7. For this reason, the inner layer sheet 3 is not seen through the outer face of the cylindrical label 1, and the cylindrical label 1 can be made to have a structure the whole of which is decorated with the design printed layer 7.

Furthermore, the one side end section 3a of the inner layer sheet 3 is the non-adhesive section 10 which is not bonded to the outer layer sheet 2; therefore, the heat-shrinkability of the outer layer sheet 2 opposite to this portion is not affected by the inner layer sheet 3. Accordingly, even if a sheet which is not thermally shrunken at relative ease is used as the inner layer sheet 3, the heat shrinkage of the whole of the cylindrical label 1 is not blocked by the inner layer sheet 3. Thus, the finish of the shrinkage near the center seal section 6 becomes good.

Second Embodiment

A second embodiment relates to a cylindrical label wherein an adhesive layer 8 is formed up to one side edge 3b of an inner layer sheet 3. Its portions different from the first embodiment will mainly be described hereinafter, and about the same or similar constituents, the corresponding terms and reference numbers are incorporated into the specification and the drawings by reference. Thus, description thereof may be omitted.

As illustrated in FIGS. 5 and 6, the present embodiment is a heat-shrinkable cylindrical label 1 wherein both side end sections 5a and 5b of a label substrate 5 wherein an inner layer sheet 3 is laminated onto the rear face 2a of a heat-shrinkable outer layer sheet 2 through an adhesive layer 8 are overlapped with each other to make the label substrate 5 into a cylindrical form thereby forming a center seal section 6, and wherein: one side edge 8b of the adhesive layer 8 is formed at least up to one side edge 3b of the inner layer sheet 3; the layer thickness thereof gradually becomes smaller from the inside toward the outside thereof (that is, toward the one side edge 3b of the inner layer sheet 3); the one side edge 3b of the inner layer sheet 3 is arranged inside one side edge 2b of the outer layer sheet 2, thereby forming an outer layer sheet exposure section 9 in the rear face of the one side end section 5a of the label substrate 5; and this outer layer sheet exposure section 9 and the front face of the other side end section 5b of the label substrate 5 are overlapped with each other and stuck to each other with a solvent or adhesive, thereby forming the center seal section 6. The cylindrical label 1 of the present embodiment is more preferably a cylindrical label wherein the one side edge 8b of the adhesive layer 8 is formed at least up to the one side edge 3b of the inner layer sheet 3; the layer thickness thereof gradually becomes smaller from the inside toward the outside thereof (that is, toward the one side edge 3b of the inner layer sheet 3); one side edge 7b of a design printed layer 7 is arranged inside the one side edge 2b of the outer layer sheet 2 and the one side edge 3b of the inner layer sheet 3 is arranged inside the one side edge 7b of the design printed layer 7, thereby forming the outer layer sheet exposure section 9 in the rear face of the one side end section 5a of the label substrate 5; and this outer layer sheet exposure section 9 and the front face of the other side end section 5b of the label substrate 5 are overlapped with each other and stuck to each other with the solvent or adhesive, thereby forming the center seal section 6.

Specifically, as illustrated in FIG. 5, the label substrate 5 has a structure wherein the design printed layer 7, the adhesive layer 8 and the inner layer sheet 3 are laminated, in this order, onto the rear face 2a of the heat-shrinkable outer layer sheet 2. In the rear face of the one side end section 5a of the label substrate 5, the outer layer sheet exposure section 9 is formed. In the one side end section 5a of the label substrate 5, the design printed layer 7 is arranged so as to position its one side edge 7b inwards by a given width W1 from the one side edge 2b of the outer layer sheet 2, and the inner layer sheet 3 is arranged to position its one side edge 3b inside the one side edge 7b of the design printed layer 7. Furthermore, the adhesive layer 8 is arranged in such a manner that its one side edge 8b extends to a position which is located slightly outwards from the one side edge 3b of the inner layer sheet 3. This adhesive layer 8 is formed in such a manner that the layer thickness thereof gradually becomes smaller from the inside toward the outside thereof (toward the one side edge 3b of the inner layer sheet 3). About one side end section 8c of the tapered adhesive layer 8, which is gradually inclined downward toward the outside, it is more preferred that the inclination angle thereof is smaller. The width W4 of the tapered one side end section 8c is, for example, from about 2 to 5 mm.

As illustrated in FIG. 6, both the side end sections 5a and 5b of the label substrate 5 are overlapped with each other, and stuck to each other through a solvent or the like, thereby making the cylindrical label 1 having the center seal section 6.

The label substrate 5 and the cylindrical label 1 of the present embodiment can be produced in the same manner as in the first embodiment. The production will be briefly described hereinafter by way of an example of the method of producing two lines of label substrates 5 from a sheet original.

As illustrated in FIGS. 7(a) and (b), a heat-shrinkable outer layer sheet original 27 having a given width is prepared. By gravure printing or the like, a design printed layer 7 is formed, in the longitudinal direction, onto the rear face of this outer layer sheet original 27 except areas corresponding to outer layer sheet exposure sections 9 extending from both side edges of the rear face. Next, a gravure roll plate or the like is used to coat an adhesive onto the rear face of the printed outer layer sheet original 27 and inside of both side edges of the design printed layer 7 in order to form an adhesive layer 8. At this time, both side end sections of the adhesive layer 8 are coated in such a manner that the side end sections become thinner toward the side edges thereof. Next, both side end sections of an inner layer sheet original fed from an inner layer sheet original roll is cut in the longitudinal direction with a cutter and removed, immediately before the inner layer sheet original is stuck to the adhesive layer 8, in such a manner that the inner layer sheet original is made slightly smaller than the entire width between both the side edges of the adhesive layer 8. Both the side edges of the cut inner layer sheet are arranged to be positioned slightly inwards from both the side edges of the adhesive layer 8. The inner layer sheet are stuck to the adhesive layer 8 and sufficiently compressed with compressing rolls. In this way, the inner layer sheet 3 is laminated.

Instead of the production method of cutting the inner layer sheet original into the given width and then sticking the original to the outer layer sheet, as described above, the inner layer sheet 3 can be laminated by sticking the inner layer sheet original to the outer layer sheet original on which the adhesive layer 8 is formed, and then cutting and removing both the side end sections of the inner layer sheet original, in the longitudinal direction, at positions located slightly inwards from both the side edges of the adhesive layer 8 in the same manner as in the modified example of the production method of the first embodiment (FIG. 4(c)).

The whole is cut in the longitudinal direction along a substrate cutting-planed line 20', thereby yielding two lines of label substrate continuums 28 and 29 which are the same as each other. In this way, a cylindrical label continuum can be produced.

When a label substrate continuum having 4 or more lines is produced at a time, the heat-shrinkable sheet original 27, which has the given width, is regarded as one unit and a sheet original wherein plural units each equivalent to this unit are continuously connected to each other in the width direction is used to perform the respective steps in the same way.

About the above-mentioned cylindrical label 1 also, the center seal section 6 can be certainly formed at ease in the same manner as in the first embodiment. Thus, the center seal section 6 neither becomes thick nor hard. The side edges of the inner layer sheet 3 do not protrude from the outer edges of the center seal section 6 after the cylindrical label is thermally shrunken. Moreover, the design printed layer 7 and the inner layer sheet 3 are arranged to be slid inward. Besides, the one side end section 8c of the adhesive layer 8 is formed into such a tapered form that the one side end section 8c gradually becomes thinner toward the outer side thereof. As illustrated in FIG. 6, according to this structure, the external form of the cylindrical label 1 extending from the center seal section 6 to the vicinity of the one side edge 3b of the inner layer sheet 3 becomes a relatively gentle line or curved line. Accordingly, no large step makes its appearance in the surface of the cylindrical label 1. Thus, the cylindrical label 1 exhibits a beautiful external appearance after the label 1 is thermally shrunken.

The one side end section 3a of the inner layer sheet 3, including the one side edge 3b thereof, is integrated, through the adhesive layer 8, with the outer layer sheet 2. Thus, when the center seal section 6 is formed, it is not feared that the one side edge 3b of the inner layer sheet 3 is turned. As a result, the center seal section 6 can be certainly formed at ease.

Additionally, in the adhesive layer 8, the one side edge 8b thereof is formed to protrude outside the inner layer sheet 3. However, the portion protruding outside the inner layer sheet 3 is very thin. Accordingly, at the time of the production, this portion does not substantially have adhesive force when the label substrate continuum is wound. It is not therefore feared that when the label substrate continuum is wound into a roll form, adhesion between the layers thereof is generated. The one side edge 8b of the adhesive layer 8 described in the present embodiment may be formed to be consistent with the one side edge 3b of the inner layer sheet 3.

Third Embodiment

A third embodiment relates to a cylindrical label wherein inner layer sheet 3 portions in one side end section 5a and the other side end section 5b of a label substrate 5 do not overlap with each other in the vertical direction. Its portions different from the first and second embodiments will mainly be described hereinafter, and about the same or similar constituents, the corresponding terms and reference numbers are incorporated into the specification and the drawings by reference. Thus, description thereof may be omitted.

As illustrated in FIG. 8(a), in an overlap margin section 5d of a label substrate 5 which extends outward from a center seal section 6, an inner layer sheet 3 in this overlap margin section 5d is formed to be positioned outside one side edge 3b of the inner layer sheet 3 in the one side end section 5a of the label substrate 5 with which the other side edge 3c of the inner layer sheet 3 is overlapped. In other words, in the overlap margin section 5d generated when the label substrate 5 is formed into a cylindrical form, the inner layer sheet 3 in the rear face of the other side end section 5b of the label substrate 5 is arranged not to overlap with one side end section 3a of the inner layer sheet 3 in the vertical direction through the outer layer sheet 2.

In the cylindrical label 1 of the present embodiment, not only in the center seal section 6 but also in the overlap margin section 5d, faces of the inner layer sheet 3 do not overlap with each other in the vertical direction; therefore, the faces of the inner layer sheet 3 do not overlap with each other, in the vertical direction, in the whole of the overlapped section of both the side end sections 5a and 5b of the label substrate 5. Consequently, the cylindrical label 1 can be made to have a structure wherein the thickness of the whole is substantially even.

The interval W5 between the other side edge 3c and the one side edge 3b of the inner layer sheet 3 is not particularly limited, and the other side edge 3c and the one side edge 3b contact each other (the edges are hit onto each other), or both the edges may be separated from each other to some extent.

Incidentally, in the case of using, as the inner layer sheet 3, a sheet having heat insulating property, heat insulating property can be given to the cylindrical label 1. However, in the case of using the heat insulating sheet as the inner layer sheet 3, the area which does not have the inner layer sheet 3 (heat-non-insulating area) becomes larger when the interval W5 between the other side edge 3c of the inner layer sheet 3 and the one side edge 3b of the inner layer sheet 3 is made too large. As a result, the heat insulating effect of the label declines. Considering this point, it is preferred that this interval W5 is made into a length of about 10% or less of the length of the whole circumference of the cylindrical label. This is because the heat insulating effect of the cylindrical label 1 is not lost and further an eating or drinking person can be caused to sense the temperature of the container. Specifically, any label-attached container, to which the cylindrical label 1 is attached, may be warmed or cooled in accordance with the kind thereof. For example, a drinking container into which drinking is filled is warmed, or stored at low temperature in many cases. When an eating or drinking person holds the label-attached container warmed or cooled in such a manner by hand, the temperature of the filler therein is conducted directly to the hand. However, when a heat insulating sheet is used as the inner layer sheet 3, the heat from the filler is blocked; it is therefore preferred that the heat insulating sheet is formed on the whole of a container-contacting face of the cylindrical label. As described above, however, when the area which does not have the heat insulating inner layer sheet 3 (heat-non-insulating area) is kept at a ratio of about 10% or less, the heat of the container is conducted to a portion of the holding hand of an eating or drinking person who holds this label-attached container. Consequently, the eating or drinking person can sense the temperature of the container at the portion. On the other hand, the person grasps the container, through the heat-insulating inner layer sheet 3, at the greater portion of the holding hand, so that the person is unlikely to feel a heat making it impossible that the person holds the container. Thus, the heat insulating effect of the label is not lost. Accordingly, the eating or drinking person can feel a just appropriate temperature-timing and eat or drink the filler.

Figure 8B:
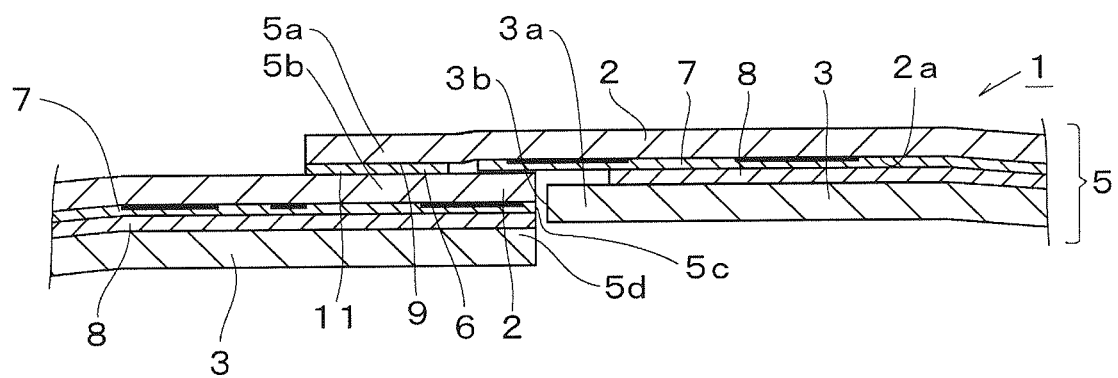

As illustrated in, for example, FIG. 8(b), a modified example of the present embodiment is a cylindrical label 1 wherein the other side edges of layers 2, 7, 8 and 3 (an outer layer sheet 2, a design printed layer 7, an adhesive layer 8 and an inner layer sheet 3) in the other side end section 5b of a label substrate 5 are put in order, and the other side edges are positioned outside one side edge 3b of the inner layer sheet 3 in the one side end section 5a, thereby forming a center seal section 6. In the case that the inner layer sheet 3 is heat-nonshrinkable in this modified example, it is preferred that the other side edge 5c of the label substrate 5 is slightly separated from the one side edge 3b of the inner layer sheet 3 without being brought into contact with the one side edge 3b. If the other side edge 5c of the label substrate 5 contacts the one side edge 3b of the inner layer sheet 3, the one side end section 3a (non-adhesive section 10) of the inner layer sheet 3 which is not thermally shrunken when the cylindrical label 1 is attached to a product by shrinkage hits onto the other side edge 5c of the label substrate 5 so that this portion may be deformed into a wave form.

Fourth Embodiment

A fourth embodiment relates to a cylindrical label having a container-contacting face on which a heat-sensitive adhesive is deposited. Its portions different from the first to third embodiments will mainly be described hereinafter, and about the same or similar constituents, the corresponding terms and reference numbers are incorporated into the specification and the drawings by reference. Thus, description thereof may be omitted.

As the structure of a center seal section 6 of a heat-shrinkable cylindrical label 1 in the present embodiment, the various embodiments described about the first to third embodiments can be adopted. In the figure for explaining the present embodiment, illustration of a design printed layer 7 is omitted.

A heat-sensitive adhesive is coated on a container-contacting face of the cylindrical label 1 of the present embodiment, thereby forming a adherence section 14. In the cylindrical label illustrated in FIG. 9, the rear face of an inner layer sheet 3 is a container-contacting face, and thus the adherence section 14 is formed in a portion of the rear face of the inner layer sheet 3.

Specifically, the heat-sensitive adhesive is coated, in a band form, from the upper edge of the container-contacting face (the rear face of the inner layer sheet 3) of the label substrate 5 to the lower edge thereof in the middle portion in the width direction of the label substrate 5. The width of this adherence section 14, and the number of sections each equivalent to the adherence section 14 are not particularly limited. Since this adherence section 14 is formed in order to cause the cylindrical label 1 to adhere closely to a container so as to prevent the cylindrical label 1 from skidding, the adherence section 14 should be formed to such an extent that this purpose can be attained. From this viewpoint, the width of the adherence section 14 should be set into the range of about 2 to 20 mm. The number of a site or sites where the adherence section(s) 14 is at least one.

The heat-sensitive adhesive used may be an adhesive which exhibits no adhesive property at room temperature but is heated to express adhesive property. As such a heat-sensitive adhesive, the following can be used: for example, a hot melt adhesive, a part coating heat-sensitive adhesive, delayed tacking heat-sensitive and other heat-sensitive adhesives. In the case of using, as the inner layer sheet 3, a sheet having liquid-absorptivity, such as nonwoven cloth or Japanese paper, it is preferred to use, as the heat-sensitive adhesive, a hot melt adhesive which can be coated by melting extrusion coating for the following reason: in the case that a sheet having liquid-absorptivity, such as nonwoven cloth or Japanese paper, is used and a solution-type heat-sensitive adhesive such as a part coating heat-sensitive adhesive is coated onto this liquid-absorptive sheet, a large ratio of the adhesive soaks into the liquid-absorptive sheet; therefore, it becomes necessary to use a large amount of the heat-sensitive adhesive.

The hot melt adhesive is an adhesive which does not have adhesive property at room temperature but is heated to permit adhesion to be attached, and which is heated and melted so as to be able to be coated. Examples of the hot melt adhesive include adhesive wherein additives such as a thickener are incorporated into a base resin. The base resin is such as an ethylenic resin such as ethylene-vinyl acetate copolymer or ethylene-acrylic acid copolymer, or styrene-butadiene block copolymer.

The part coating heat-sensitive adhesive is an adhesive which is heated, thereby giving adhesive property in the same manner as the hot melt adhesive, and which can be coated by printing a solution wherein a thermally-adhesive resin such as ethylene-vinyl acetate copolymer, a thickener and so on are dissolved or dispersed in an organic solvent by a printing such as gravure coating. The part coating heat-sensitive adhesive is dried and then used after the adhesive is coated.

The delayed tacking heat-sensitive adhesive is an adhesive which is heated to be activated, thereby giving adhesive property, keeps the adhesive property over a long time after cooled, and can be coated by gravure coating or the like. Examples of the delayed tacking heat-sensitive adhesive include emulsion type adhesives wherein a thickener and a solid plasticizer are incorporated into a base resin such as ethylene-vinyl acetate copolymer, vinyl acetate-acrylic acid ester copolymer, or synthetic rubber.

The heat-shrinkable cylindrical label 1 and the label-attached container of the present embodiment can be produced by, for example, the following method.

A label substrate continuum wherein the outer layer sheet 2, the design printed layer 7 and the inner layer sheet 3 are laminated and bonded to each other is formed. It is advisable to adopt the method for forming the label substrate continuum appropriately out of the various methods described about the first to third embodiments. A hot melt adhesive in a melted state is put onto the rear face of the inner layer sheet 3 of the resultant label substrate continuum (cut into a given width) through a nozzle, thereby coating the hot melt adhesive into a band form in the sheet-forwarding direction (into a band form in the longitudinal direction). Thereafter, in the same manner as in the first to third embodiments, a solvent or adhesive is coated along the outer layer sheet exposure section 9, and then both of the side end sections 5a and 5b are overlapped with each other and stuck to each other, thereby producing a cylindrical label continuum. The heat-sensitive adhesive does not exhibit adhesive property at room temperature; therefore, even if this cylindrical label continuum is wound into a flat form, it is not feared that the inner face of the cylindrical label continuum is bonded.

The cylindrical label continuum is cut into a given length, thereby forming the cylindrical label 1, and this is fitted and inserted into the body of a container and heated to a given temperature (about 80 to 100° C.) to shrink the cylindrical label 1 thermally. In this way, a label-attached container, Wherein the cylindrical label 1 is attached to the body of the container, can be obtained.

If necessary, a heating device for heating the heat-sensitive adhesive in a spot form may be used together.

In the cylindrical label 1, the adherence section 14, which is made of a heat-sensitive adhesive which can be stuck by heating, is formed on a portion of the container-contacting face. Accordingly, heat when the cylindrical label 1 is thermally shrunken makes the heat-sensitive adhesive into an adhesion-permissible state, so that the adherence section 14 is stuck onto the outer face of the container. In this label-attached container, the adherence section 14 of the cylindrical label 1 is stuck to the container. Thus, the cylindrical label 1 can be prevented from being rotated around the container.

Specifically, a heat-shrinkable cylindrical label is a label which is attached to a container by heat shrinkage. However, the attached cylindrical label may slide and skid onto the outer face of the container because of the material of the cylindrical label, the kind of the container, or the like.

For example, in the case of the cylindrical label 1 wherein a nonwoven cloth or Japanese paper is used as the inner layer sheet 3, the friction coefficient between the container-contacting face of the cylindrical label 1 and the container becomes small. Thus, this cylindrical label tends to be easily slid on the outer face of the container.

About a container to which a screwed cap for sealing is set, a cylindrical label attached thereto is held by a single hand and simultaneously the screwed cap is rotated in the case that the screwed cap is opened. Accordingly, the cylindrical label tends to skid easily. As a result, the screwed cap may not be opened or closed at ease.

It is therefore effective to form the above-mentioned adherence section onto the container-contacting face of the cylindrical label 1 wherein a nonwoven cloth or Japanese paper is used as the inner layer sheet, or the container-contacting face of the cylindrical label which is to be attached to a container having a screwed cap.

An example of the contained having the screwed cap is a container as illustrated in FIG. 10, which has a cylindrical body 41 to which a cylindrical label is attached, a pouring mouth 42 opened in the upper of the body 41, and a screwed cap 43 which can be put on and taken off by being rotated around a central axis L of this pouring mouth 42 by action of the screw. The material of the container is not particularly limited, and the container may be made of a metal such as aluminum or steel (or an aluminum plate or steel plate on which a synthetic resin sheet is laminated), a synthetic resin such as polyethylene terephthalate, glass, or the like. In particular, about the following container, the friction coefficient thereof to the cylindrical label is liable to be small: a bottle can made of a metal such as aluminum or steel; a bottle can which is made of aluminum or steel and which has a polyethylene terephthalate sheet laminated on its surface (or has a resin-coated surface); or the like The following will describe a modified example of the present embodiment.

In the above-mentioned cylindrical label 1, a heat-sensitive adhesive is coated on the rear face of the inner layer sheet to form the adherence section 14. As illustrated in, e.g., FIGS. 11, however, an area 15 where an inner layer sheet 3 is not laminated is formed (in sections other than an outer layer sheet exposure section 9), and a heat-sensitive adhesive is coated onto this area 15, thereby making it possible to form a adherence section 14. As the heat-sensitive adhesive, the above-mentioned hot melt adhesive, part coating heat-sensitive adhesive or delayed tacking heat-sensitive adhesive, or the like can be used. In the present modified example, the heat-sensitive adhesive is coated directly onto an outer layer sheet 2 (strictly speaking, a design printed layer 7). Accordingly, even if a sheet having liquid-absorptivity is used as the inner layer sheet 3, no part of the coated heat-sensitive adhesive is absorbed into the inner layer sheet 3. Thus, not only the hot melt adhesive can be coated but also the part coating heat-sensitive adhesive, the delayed tacking heat-sensitive adhesive or the like can be coated by a printing method such as gravure coating.

Specifically, in the case of coating a heat-sensitive adhesive of a solution type onto the inner layer sheet 3 having liquid absorptivity as described above, a relatively large amount of the adhesive becomes necessary since the adhesive soaks into the inner layer sheet 3. Thus, in this case, it is appropriate to use a hot melt adhesive. However, any hot melt adhesive has a drawback that the adhesive cannot freely be coated into a desired position or size (design) since the adhesive cannot be coated by printing. However, in the case that a part coating heat-sensitive adhesive or the like cannot be coated by printing in any printing step because of a limitation to the number of colors of design printing, it is preferred to use a hot melt adhesive which can be coated at the time of the working into a cylindrical form. On the other hand, a part coating heat-sensitive adhesive or the like can be coated by printing; therefore, the adhesive can be coated into a dot form, a net form, or any other design. Additionally, it is sufficient that the amount of the used adhesive is a small amount. Moreover, at the time of the production, the heat-sensitive adhesive can be printed in one part of the printing step for forming the design printed layer 7 onto the outer layer sheet 2. Thus, the process of the production can be made simple.

As illustrated in FIG. 12(a), an outer layer sheet exposure section 9 is formed to have a larger width than in the first to third embodiments. A heat-sensitive adhesive may be coated onto any area of this outer layer sheet exposure section 9 other than the area which constitutes a center seal section 6.

In the modified example, the single area 15 where the inner layer sheet 3 is not laminated is exemplified. As illustrated in, e.g., FIG. 13(a), however, two or more areas 15 where the inner layer sheet 3 is not laminated can be disposed, and a adherence section 14 may be formed in each of the areas 15.

In the above-mentioned cylindrical label 1, the adherence section 14 is formed, in a band form, in the longitudinal direction so as to extend from the upper edge of the label substrate 5 to the lower edge thereof. As illustrated in FIG. 13(b), however, a adherence section 14 may be formed in a dotted line form.

Other Embodiments

The present invention is not limited to the above-mentioned embodiments, and an appropriate constituent can be added thereto, or one or more constituents of the embodiments may be substituted, or modified in design. Constituents or parts different from the first to fourth embodiments will mainly be described hereinafter, and about the same or similar constituents, the corresponding terms and reference numbers are incorporated into the specification and the drawings by reference. Thus, description thereof may be omitted.

In each of the above-mentioned embodiments, the respective layers formed on the rear face 2a of the outer layer sheet 2 are arranged so as to be shifted (slid) in position. However, these layers may be formed so as to make side edges of one side end section of two layers of the layers 2, 7, 8 and 3 consistent with each other. As illustrated in, e.g., FIG. 14, side edges 7b, 8b and 3b of one side end section of a design printed layer 7, an adhesive layer 8 and an inner layer sheet 3 may be made consistent with each other and arranged inside one side edge 2b of an outer layer sheet 2.

In each of the above-mentioned embodiments, the design printed layer 7 interposed between the outer layer sheet 2 and the inner layer sheet 3 is exemplified. As illustrated in, e.g., FIG. 15, however, permissible is a cylindrical label 1 wherein a design printed layer 7 is formed on the front face of an outer layer sheet 2. In this case, the other side edge 7c of the design printed layer 7 is preferably disposed just near a center seal section 6, or disposed at a position near the center seal section 6, as illustrated in FIG. 15. This cylindrical label can be produced by coating an adhesive onto the rear face of an outer layer sheet original wherein a design is printed on its front face while the outer layer sheet exposure section 9 is formed in the rear face, and then performing the same steps as in the first embodiment.

As illustrated in, e.g., FIG. 16, layers 2, 7, 8 and 3 in one side end section 5a and the other side end section 5b of a label substrate 5 are formed to be bilateral-symmetrically slid in position. These layers may be formed so as to make the other side edges of two or three layers of the layers 2, 7, 8 and 3 consistent with each other.

An easily-opening section, such as perforations, may be made in a cylindrical label 1 along the longitudinal direction. As illustrated in FIG. 16, it is preferred to make such an easily-opening section 12 as the perforations inside a center seal section 6 and in a non-adhesive section of the inner layer sheet 3. Preferably, two easily-opening sections may be made. In the case of the inner layer sheet 3 having heat insulating property, the sheet 3 generally has a relatively large thickness so that the sheet 3 is not divided at ease. However, one side edge 3b of the inner layer sheet 3 is formed inside and further the non-adhesive section 10 is certainly maintained, as described above; therefore, the easily-opening section 12, such as the perforations, can be formed in the non-adhesive section of the inner layer sheet 3 and the attached cylindrical label 1 can easily be cut and removed. The perforations correspond to open holes arranged intermittently at intervals of a given length, such as holes made with a sewing-machine needle.

As illustrated in FIG. 17(a), in the production of the cylindrical label 1 wherein the easily-opening section 12 is made, the design printed layer 7 is formed, in the longitudinal direction, onto the rear face of an outer layer sheet original 30 having a given width by gravure printing or the like, except an area having a width W1 corresponding to an outer layer sheet exposure section 9 extending from both side edges of the outer layer sheet original 30. Next, the easily-opening section 12, such as the perforations, is made in the outer layer sheet original 30 and inside the area corresponding to the outer layer sheet exposure section 9. The easily-opening section 12, such as the perforations, can be made after a label substrate continuum which will be described later is produced and before the continuum is subjected to center sealing. Next, as illustrated in FIG. 17(b), an adhesive is coated inside the perforations (in the case of making plural lines of perforations 12, the innermost perforations 12) to form the adhesive layer 8. Next, as illustrated in FIG. 17(c), an inner layer sheet original is cut with a cutter to have a slightly larger width than the entire width of each piece of the adhesive layer 8. Both side edges of the inner layer sheet are then arranged to be positioned between both side edges of the design printed layer 7 and both side edges of the adhesive layer 8, respectively, and the sheet is stuck and compressed with compressing rolls. In this way, the inner layer sheet 3 is laminated. It is allowable to stick the inner layer sheet original and subsequently cut at given positions. Thereafter, the resultant is shaped into a cylindrical form in the same manner as in the first embodiment, thereby yielding a cylindrical label continuum wherein the easily opening 12 is made. In this way, the cylindrical label 1 according to the modified example shown in FIG. 16 can be produced.

An overcoat layer having slipping property, a mat coating layer for matting, or the like may be appropriately formed on the front face of the outer layer sheet 2. In the case of forming the overcoat layer or the mat coat layer on the front face of the outer layer sheet 2 in this way, it is preferred that the over coat layer or the like is not formed in the section where the center seal section 6 is formed, or the over coat layer or the like is formed therein to have a very small thickness.

In each of the above-mentioned embodiments, as the method of producing the label substrate continuum, a method capable of producing label substrate continuums into even lines such as 2 lines or 4 lines at a time has been exemplified. However, a line of a label substrate continuum can be produced, or label substrate continuums can be produced into three or more odd lines at a time.

In the method of producing one line of a label substrate continuum, as illustrated in FIG. 18, a design printed layer 7 is formed in the rear face of an outer layer sheet original 32 having a slightly larger width than the width of a label substrate 5 and in a given longitudinal area inside an area having a width W1 corresponding to an outer layer sheet exposure section 9 in one side end section of the rear face. In the rear face of this printed outer layer sheet original 32, an adhesive is coated inside one side edge of the design printed layer 7 to form an adhesive layer 8. Next, an inner layer sheet original fed from an inner layer sheet original roll is cut in the longitudinal direction at its side end section with a cutter, immediately before the original is stuck to the adhesive layer 8, in such a manner that the original will have a slightly wider than the entire width of the adhesive layer 8. The resultant inner layer sheet is arranged to position one side end section of this sheet between the one side edge of the design printed layer 7 and one side edge of the adhesive layer 8, and then the inner layer sheet is stuck. In this way, the inner layer sheet 3 is laminated.

Instead of this, the following can be attained in the same manner as in the above-mentioned embodiments: the inner layer sheet original is stuck to the outer layer sheet original 32, and subsequently the one side end section of the inner layer sheet original is cut in the longitudinal direction between the one side edge of the design printed layer 7 and the one side edge of the adhesive in order to make the outer layer sheet exposure section 9 exposed. In this way, the inner layer sheet 3 can be laminated.

The resultant label substrate continuum is wound into a roll form. As illustrated in FIG. 18, in the case that unnecessary sections X (shown by alternate long and two short dashes lines) in both sides of the label substrate continuum protrude or an unnecessary section Y (shown by an alternate long and two short dashes line) in the other side end section of the foamed resin layer 3 protrudes from the other side edge of the label substrate continuum, the other side end section of the label substrate continuum may be appropriately cut in the longitudinal direction. The method of producing label substrate continuums into lines of 3 or more odd number can be attained by a combination of the above-mentioned one-line producing method with the even number line producing method exemplified about the first embodiment.

In the method of producing label substrate continuums into, for example, 3 lines, there is prepared an outer layer sheet original 33 having a width substantially three times the width of a label substrate 5, as illustrated in FIG. 19. Through each step which will be described later, this outer layer sheet original 33 is cut in the longitudinal direction on a substrate cutting-planed line 20' and a sheet cutting-planed line 20 out of cutting lines for cutting the original into three equal parts in the width direction, whereby 3 lines of label substrate continuums 34, 35 and 36 can be yielded.

Design printed layers 7' and 7" are formed onto the rear face of this outer layer sheet original 33, except an area which have a width W1 corresponding to an outer layer sheet exposure section 9 and which extend from one side edge of the outer layer sheet original 33, and except an areas which have widths W1 and W1 corresponding to a width two times the width of the outer layer sheet exposure section 9 and are arranged beside the sheet cutting-planed line 20 as a center. About indications of this design printing, the indications are printed in reverse directions in the label substrate continuums 34 and 36 in the odd number lines and the label substrate continuum 35 in the even number line. Next, an adhesive is coated onto the rear face of the printed outer layer sheet original 33 and inside both side edges of the left design printed layer 7' and one side edge of the right design printed layer 7" to form adhesive layers 8' and 8", respectively. Next, an inner layer sheet original fed from an inner layer sheet original roll is appropriately cut in the longitudinal direction immediately before the original is stuck to the adhesive layers 8, and then inner layer sheets 3' and 3" are each stuck so as to position both side edges of the left inner layer sheet 3' between both the side edges of the left design printed layer 7' and both side edges of the left adhesive layer 8' and further position one side edge of the right inner layer sheet 3" between the one side edge of the right design printed layer 7" and one side edge of the right adhesive layer 8". After the inner layer sheet original is stuck, the method of cutting this original at appropriate positions can be adopted, as described above.

The whole is cut in the longitudinal direction along the sheet cutting-planed line 20 and the substrate cutting-planed line 20', thereby making it possible to yield three lines of the same label substrate continuums 34, . . . .

In the case of producing two or more lines (plural lines) of label substrate continuums, in each of the above-mentioned embodiments the design-print indications are printed so as to be alternately directed into reverse directions. However, for example, the label substrate continuums can be produced in the state that design-print indications in all lines thereof are printed into the same direction. In this case, the other side edge of the first line of the label substrate continuums and one side edge of the second line thereof are continuous, and further the other side edge of the second line and one side edge of the third line are continuous (the same matter is applied to the fourth line and subsequent lines). Each of the lines can be produced by a method equivalent to the above-mentioned one-line producing method.

What is claimed is:

1. A heat-shrinkable cylindrical label comprising:
   a heat-shrinkable outer layer sheet comprising a side edge, a front face, and a rear face;
   an inner layer sheet comprising a side edge;
   an adhesive layer comprising a side edge, wherein the adhesive layer is disposed between the inner and outer layers;
   wherein the side edge of the outer layer sheet extends past the side edges of the inner layer sheet and the adhesive layer;
   wherein the side edge of the inner sheet extends past the side edge of the adhesive layer; and
   wherein the rear face of the outer layer sheet adjacent the side edge of the outer layer overlaps and is directly bonded to the front face of the outer layer sheet.

2. The heat-shrinkable cylindrical label according to claim 1, wherein an area where the inner layer sheet is not laminated is formed, and a heat-sensitive adhesive is coated onto the area.

3. A heat-shrinkable cylindrical label comprising:
a heat-shrinkable outer layer sheet comprising a side edge, a front face, and a rear face;
an inner layer sheet comprising a side edge;
a design printed layer comprising a side edge, wherein the design printed layer is disposed between the inner and outer layers;
wherein the side edge of the outer layer sheet extends past the side edges of the inner layer sheet and the design printed layer;
wherein the side edge of the design printed layer extends past the side edge of the inner layer sheet; and
wherein the rear face of the outer layer sheet adjacent the side edge of the outer layer sheet overlaps and is directly bonded to the front face of the outer layer sheet.

4. A heat-shrinkable cylindrical label comprising
a heat-shrinkable outer layer sheet comprising a side edge, a front face, and a rear face;
an inner layer sheet comprising a side edge;
a design printed layer comprising a side edge, wherein the design printed layer is disposed between the inner and outer layers;
an adhesive layer comprising a side edge, wherein the adhesive layer is disposed between the inner and outer layers;
wherein the side edge of the outer layer sheet extends past the side edges of the inner layer sheet, the design printed layer, and the adhesive layer;
wherein the side edge of the design printed layer extends past the side edges of the inner layer sheet and the adhesive layer;
wherein the side edge of the inner layer sheet extends past the side edge of the adhesive layer; and
wherein the rear face of the outer layer sheet adjacent the side edge of the outer layer overlaps and is directly bonded to the front face of the outer layer sheet.

5. The heat-shrinkable cylindrical label according to claim 4, wherein the inner layer sheet further comprises another side edge, wherein the another side edge is positioned so as to not overlap the side edge of the inner layer sheet.

6. The heat-shrinkable cylindrical label according to claim 4, wherein the inner layer sheet comprises a sheet having heat insulating property.

7. The heat-shrinkable cylindrical label according to claim 4, wherein the inner layer sheet comprises a foamed resin sheet.

8. The heat-shrinkable cylindrical label according to claim 4, wherein the inner layer sheet comprises a nonwoven cloth.

9. The heat-shrinkable cylindrical label according to claim 4, which has a container-contacting face on which a heat-sensitive adhesive is coated.

* * * * *